(12) United States Patent
van Oort et al.

(10) Patent No.: US 10,859,481 B2
(45) Date of Patent: Dec. 8, 2020

(54) SYSTEMS AND METHODS FOR DETERMINING A FLUID CHARACTERISTIC

(71) Applicant: Board of Regents, The University of Texas System, Austin, TX (US)

(72) Inventors: Eric van Oort, Austin, TX (US); Ali Karimi Vajargah, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 83 days.

(21) Appl. No.: 15/690,655

(22) Filed: Aug. 30, 2017

(65) Prior Publication Data

US 2018/0058992 A1 Mar. 1, 2018

Related U.S. Application Data

(60) Provisional application No. 62/381,806, filed on Aug. 31, 2016.

(51) Int. Cl.
| | |
|---|---|
| *G01N 11/02* | (2006.01) |
| *E21B 21/08* | (2006.01) |
| *E21B 47/06* | (2012.01) |
| *G01N 11/00* | (2006.01) |

(52) U.S. Cl.
CPC ............. *G01N 11/02* (2013.01); *E21B 21/08* (2013.01); *E21B 47/06* (2013.01); *G01N 2011/0026* (2013.01)

(58) Field of Classification Search
CPC ................................. G01N 11/02; G01N 11/04
See application file for complete search history.

(56) References Cited

U.S. PATENT DOCUMENTS

| | | | |
|---|---|---|---|
| 3,468,158 A | 9/1969 | Chien | |
| 4,384,792 A | 5/1983 | Sommers et al. | |
| 4,557,142 A | 12/1985 | Hensley et al. | |
| 4,680,957 A | 6/1987 | Dodd | |
| 4,726,219 A * | 2/1988 | Pearson | E21B 21/01 73/152.39 |
| 4,821,564 A | 4/1989 | Pearson et al. | |
| 5,042,296 A | 8/1991 | Burgess | |
| 5,315,863 A | 5/1994 | Cowper | |
| 5,327,984 A | 7/1994 | Rasi et al. | |
| 5,741,978 A | 4/1998 | Gudmundsson et al. | |
| 6,176,323 B1 | 1/2001 | Weirich et al. | |
| 6,378,357 B1 * | 4/2002 | Han | G01F 1/663 73/53.01 |
| 6,659,197 B2 * | 12/2003 | Cooper | E21B 49/003 175/48 |
| 6,691,561 B2 | 2/2004 | Lin et al. | |

(Continued)

FOREIGN PATENT DOCUMENTS

WO 2015175784 A1 11/2015

OTHER PUBLICATIONS

Supplementary European Search Report Issued to EP17847432 dated May 26, 2020 (Year: 2020).*

(Continued)

*Primary Examiner* — Nathaniel J Kolb
(74) *Attorney, Agent, or Firm* — Patterson + Sheridan, LLP

(57) ABSTRACT

The present disclosure relates to systems and methods for determining a fluid characteristic of a fluid flowing within a flow region.

17 Claims, 10 Drawing Sheets

(56) References Cited

U.S. PATENT DOCUMENTS

| | | | |
|---|---|---|---|
| 6,681,189 B1 | 6/2004 | Morrison et al. | |
| 6,755,079 B1 | 6/2004 | Proett et al. | |
| 7,036,362 B2 | 5/2006 | Haddad et al. | |
| 7,832,257 B2* | 11/2010 | Weightman | G01N 11/04 |
| | | | 73/54.09 |
| 8,321,190 B2 | 11/2012 | Hansen et al. | |
| 8,881,577 B1 | 11/2014 | Agar et al. | |
| 9,909,413 B2 | 3/2018 | van Oort et al. | |
| 2003/0029640 A1* | 2/2003 | Cooper | E21B 49/003 |
| | | | 175/40 |
| 2008/0264182 A1 | 10/2008 | Jones et al. | |
| 2009/0308601 A1 | 12/2009 | Poe et al. | |
| 2010/0139374 A1 | 6/2010 | Dermody et al. | |
| 2011/0042076 A1 | 2/2011 | Reitsma | |
| 2011/0182141 A1 | 7/2011 | Zhamikov et al. | |
| 2011/0199228 A1 | 8/2011 | Roddy et al. | |
| 2013/0019673 A1 | 1/2013 | Sroka et al. | |
| 2013/0025359 A1* | 1/2013 | Cartellieri | E21B 49/081 |
| | | | 73/152.55 |
| 2013/0048380 A1 | 2/2013 | Rasmus et al. | |
| 2013/0090855 A1 | 4/2013 | Rasmus et al. | |
| 2013/0345994 A1 | 12/2013 | Wilklund et al. | |
| 2014/0012507 A1 | 1/2014 | Trehan et al. | |
| 2014/0131104 A1 | 5/2014 | Coley et al. | |
| 2015/0059446 A1 | 3/2015 | Agar et al. | |

OTHER PUBLICATIONS

Ahmed et al. "Friction Pressure Loss Determination of Yield Power Law Fluid in Eccentric Annular Laminar Flow," Wiertnictwo Nafta Gaz, 2006, 23(1), 47-53.
Broussard et al. "Making real-time fluid decisions with real-time fluid data at the rig site." Society of Petoleum Engineers, 2010, SPE-137999-MS.
Gravdal et al. "Wired drill pipe telemetry enables real-time evaluation of kick in Managed Pressure Drilling," Society of Petroleum Engineers, 2010, SPE-132989-MS.
Haciislamoglu et al., "Non-Newtonian flow in eccentric annuli", Journal of Energy Resources, 1990, 112, 163-169.
Hernandez et al. "High-speed wired drill-string telemetry network delivers increased safety, efficiency, reliability and productivity to the drilling industry," Society of Petroleum Engineers, 2008, SPE-113157-MS.
Karimi et al., "Automated Drilling Fluid Rheology Characterization with Downhole Pressure Sensor Data", Society of Petroleum Engineers, 2015, SPE-IADC-173085-MS.
Kotze et al. "A feasibility study of in-line rheological characterisation of a wastewater sludge using ultrasound technology." Water SA, 2014, 40(4), 580-586.
Lesso et al. "The utilization of the massive amount of real time data acquired in wired-drillpipe operations," Society of Petroleum Engineers, 2008, SPE-112702-MS.
MacPherson et al. "Drilling-systems automation: Current state, initiatives, and potential impact," Society of Petroleum Engineers, 2013, SPE-166263-PA.
Reeves et al. "Intelligent drill string field trials demonstrate technology functionality," Society of Petroleum Engineers, 2005, SPE-92477-MS.
Stock et al. "The development and successful application of an automated real-time drilling fluids measurement system." Society of Petroleum Engineers, 2012, SPE-150439-MS.

Vajargah et al. "Feasibility study of applying intelligent drill pip in early detection of gas influx during conventional drilling," Society of Petroleum Engineers, 2013, SPE-163445-MS.
Veeningen, Daan. "Along-string pressure evaluation enabled by broadband networked drillstring provide safety, efficiency gains," Offshore Technology Conference, Rio de Janeiro, Brazil, Oct. 4-6, 2011, doi:10.4043/22239-MS.
Weir, Iain. "A Statistical Study of Rheological Models for Drilling Fluids," Society of Petroleum Engineers, 1996, SPE 36359.
Zamora et al. "Comparing a Basic Set of Drilling Fluid Pressure-Loss Relationships to Flow-Loop" AADE 2005 National Technical Conference and Exhibition, Houston, Apr. 5-7, 2005, AADE-05-NTCE-27.
International Search Report and Written Opinion dated Aug. 12, 2015, in related International Application No. PCT/US2015/030783.
International Preliminary Report on Patentability dated Nov. 24, 2016, in related International Application No. PCT/US2015/030783.
International Search Report and Written Opinion dated Nov. 8, 2017 in International Application No. PCT/US2017/049285.
Karimi Vajargah A and van Oort, E. "Determination of drilling fluid rheology under downhole conditions by using real-time distributed pressure data" Journal of Natural Gas Science and Engineering, 2015, 24, 400-411.
Erge O et al. "The Effects of Drillstring Eccentricity, Rotation, and Buckling Configurations on Annular Frictional Pressure Losses While Circulating Yield Power Law Fluids." Society of Petroleum Engineers, IADC/SPE Drilling Conference and Exhibition, Mar. 4-6, 2014, Fort Worth, Texas, USA, SPE-167950-MS.
Erge O et al. "Frictional pressure loss of drilling fluids in a fully eccentric annulus." Journal of Natural Gas Science and Engineering, 2015, 26, 1119-1129.
Erge O et al. "Improved ECD Prediction and Management in Horizontal and Extended Reach Wells with Eccentric Drillstrings." Society of Petroleum Engineers, IADC/SPE Drilling Conference and Exhibition, Mar. 1-3, 2016, Fort Worth, Texas, USA, SPE-178785-MS.
Colebrook RA. "Turbulent flow in pipes, with particular reference to the transition region between the smooth and rough pipe laws." Journal of the Institute of Civil Engineering, 1939, 11, 133-156.
Dodge DW and Metzner AB. "Turbulent flow of non-newtonian systems." *AIChE J*. 1959, 5(2), 189-204.
Collins M and Schowalter WR., "Behavior of non-Newtonian fluids in the entry region of a pipe." AIChE Journal, 1963, 9(6), 804-809.
Chilton RA and Stainsby R. "Pressure Loss Equations for Laminar and Turbulent Non-Newtonian Pipe Flow." Journal of Hydraulic Engineering, 1998, 124(5), 522-529.
Subramanian R and Azar JJ. "Experimental Study on Friction Pressure Drop for Non-Newtonian Drilling Fluids in Pipe and Annular Flow." Society of Petroleum Engineers, International Oil and Gas Conference and Exhibition in China, Nov. 7-10, 2000, Beijing, China, SPE-64647-MS.
Graham MD. "Drag reduction in turbulent flow of polymer solutions." *Rheology Reviews*, 2004, 2, 143-170.
Reed, T.D. And Pilehvari, A.A. 1993. A New Model for Laminar, Transitional, and Turbulent Flow of Drilling Muds. Paper SPE 25456 presented at the SPE Production Operations Symposium, Oklahoma City, Oklahoma, Mar. 21-23.
Supplementary European Search Report issued to EP17847432 dated May 26, 2020.

\* cited by examiner

SYSTEMS AND METHODS FOR DETERMINING A FLUID CHARACTERISTIC

CROSS-REFERENCE TO RELATED APPLICATIONS

This application claims the benefit of U.S. Provisional Application No. 62/381,806, filed Aug. 31, 2016, which is hereby incorporated herein by reference in its entirety.

FIELD OF THE INVENTION

The present disclosure relates to systems and methods for determining a fluid characteristic of a fluid flowing within a flow region.

BACKGROUND

Accurate measurement of drilling fluid rheological properties can be important for optimizing wellbore construction, and in particular for properly managing hydraulics. Accurate measurement of drilling fluid rheological properties can be even more important during deep-water drilling when a "narrow mud window" is present which can require the use of more advanced drilling technologies such as Managed Pressure Drilling (MPD) and Dual Gradient Drilling (DGD). Operating these technologies properly can require the use of sophisticated hydraulic models that can require accurate rheological information as input. However, a full mud check with determination of all relevant rheological parameters is usually only carried out once a day, and augmented with one or two partial checks in a 24 hour period. The results are also dependent on the mud engineer carrying out the tests. Such intermittent and unreliable measurements are not sufficient to provide the required inputs for "real-time" hydraulic modeling and control. A more practical approach for a continuous, automated monitoring of the drilling fluid properties is therefore called for. The methods and systems describes herein address these and other needs.

SUMMARY

Described herein are methods for determining a fluid characteristic of a fluid within a flow region. In some examples, the fluid characteristic can be determined from a shear stress and a shear rate of the fluid. For example, the fluid characteristic can be determined from a relationship between the shear stress and shear rate of the fluid. In some examples, the fluid characteristic can comprise a friction factor, a Reynolds number, a density of the fluid, or a combination thereof. In some examples, the fluid can comprise a non-Newtonian fluid. The fluid can comprise, for example, a drilling fluid.

The flow region can, for example, comprise an area inside a conduit, an annulus, or a combination thereof. The annulus, for example, can comprise a region between the conduit and a wellbore, a region between the conduit and a second conduit, or a combination thereof. In certain examples, the conduit and/or the second conduit can be situated at or above the Earth's surface. In certain examples, the conduit and/or the second conduit can be situated within a wellbore. In certain examples, the differential pressure measurements can be obtained at downhole conditions of the wellbore. In some examples, the conduit can comprise a wired drill pipe.

The method can comprise, for example, measuring one or more flow rates and a corresponding one or more differential pressures of a fluid flowing within a flow region to produce a one or more measured flow rates and a corresponding one or more differential pressure measurements. In some examples, at least a portion of the one or more measured flow rates and the corresponding one or more differential pressure measurements correspond to the fluid flowing in the flow region in a transitional flow regime, a turbulent flow regime, or a combination thereof. In some examples, the one or more flow rates includes at least 2 (e.g., at least 3, at least 4, or at least 5) different flow rates. In some examples, the corresponding one or more differential pressure measurements can include at least 2 (e.g., at least 3, at least 4, or at least 5) different differential pressure measurements. In certain examples, the one or more measured flow rates and the corresponding one or more differential pressure measurements can be obtained at downhole conditions of the wellbore.

In some examples, the method further comprises correcting, using the processing device, the respective one or more differential pressure measurements of the fluid for eccentricity between the conduit and the wellbore, or between the conduit and the second conduit. Correcting for eccentricity between the conduit and the wellbore or between the conduit and the second conduit can, for example, comprise using an equivalent pipe model, a correlation-based model, or a combination thereof.

In some examples, measuring the one or more differential pressure measurements of the fluid flowing within the flow region can comprise: measuring the pressure of the fluid flowing within the flow region using a plurality of pressure sensors at a plurality of locations within the flow region; and calculating, using the processing device, the one or more differential pressure measurements of the fluid flowing within the flow region from the pressure measurements. In some examples, the plurality of pressure sensors can include at least 2 (e.g., at least 3, at least 4, or at least 5) different pressure sensors. The plurality of locations can, for example, include at least 2 (e.g., at least 3, at least 4, or at least 5) different locations.

The methods can further comprise, in some examples, receiving, using a processing device, the one or more measured flow rates and the corresponding one or more differential pressure measurements; storing, using the processing device, the one or more measured flow rates and the corresponding one or more differential pressure measurements; and determining, using the processing device, the fluid characteristic of the fluid using the one or more measured flow rates and the corresponding one or more differential pressure measurements.

In some examples, the methods can further comprise generating a plot based on the one or more measured flow rates and/or the one or more differential pressure measurements; and wherein determining, using the processing device, the fluid characteristic of the fluid comprises using the plot. In some examples, the plot can comprise a plot of flow (e.g., a plot based on the one or more measured flow rates), a plot of pressure (e.g., a plot based on the one or more differential pressure measurements), a logarithmic plot of shear stress at a wall of the conduit versus nominal Newtonian shear rate, or a combination thereof. In some examples, the method further comprises determining, using the processing device, the fluid characteristic of the fluid from the plot. For example, the generating and determining steps can comprise generating, using the processing device, a plot based on the one or more differential pressure measurements, and determining, using the processing device, the fluid characteristic of the fluid using the plot based on the one or more differential pressure measurements.

In some examples, the method further comprises generating, using the processing device, a plot based on the one or more measured flow rates and the corresponding one or more differential pressure measurements. The plot based on the one or more measured flow rates and the corresponding one or more differential pressure measurements can, for example, be used to produce a logarithmic plot of shear stress at a wall of the conduit versus nominal Newtonian shear rate. In some examples, the methods can further comprise determining the transitional Reynolds number of the fluid using the plot of shear stress at a wall of the flow region versus nominal Newtonian shear rate. In some examples, the methods can further comprise determining, using the processing device, a flow behavior index for the fluid from the logarithmic plot of shear stress at a wall of the conduit versus nominal Newtonian shear rate. For example, the slope of the logarithmic plot of shear stress at a wall of the conduit versus nominal Newtonian shear rate can comprise the generalized flow behavior index and the intercept of the logarithmic plot of shear stress at a wall of the conduit versus nominal Newtonian shear rate can comprise a generalized consistency index.

In some examples, the method can further comprise determining, using the processing device, the fluid characteristic of the fluid using the logarithmic plot of shear stress at a wall of the conduit versus nominal Newtonian shear rate and a rheological model. For example, the methods can further comprise determining, using the processing device, the fluid characteristic of the fluid using the flow behavior index and a rheological model. For example, the method can include determining, using the processing device, the fluid characteristic of the fluid using the flow behavior index determined from the logarithmic plot of shear stress at a wall of the conduit versus nominal Newtonian shear rate and a rheological model.

The rheological model can comprise any model that can relate shear stress and shear rate, such as the Yield Power Law model.

Also disclosed herein are systems for determining a fluid characteristic of a fluid (e.g., a non-Newtonian fluid, a drilling fluid) within a wellbore. The system can be used to measure a fluid characteristic using the methods described herein. The system, for example, can comprise a conduit; a flow meter configured to measure one or more flow rates of the fluid flowing within the flow region; and a pressure sensor configured to measure one or more differential pressures corresponding to the one or more measured flow rates of the fluid flowing within the flow region. The flow region can, for example, comprise an area inside the conduit, an annulus, or a combination thereof. In some examples, at least a portion of the one or more measured flow rates correspond to the fluid flowing in the flow region in a transitional flow regime, a turbulent flow regime, or a combination thereof. In some examples, the flow meter can be configured to measure at least 2 (e.g., at least 3, at least 4, or at least 5) different flow rates.

The system can further comprise a processing device. The processing device can be configured to receive the one or more flow rates of the fluid from the flow mater; receive the corresponding one or more differential pressure measurements of the fluid from the pressure sensors; store the one or more measured flow rates and the corresponding one or more differential pressure measurements; and determine the fluid characteristic of the fluid using the one or more measured flow rates and the corresponding one or more differential pressure measurements. In some examples, the fluid characteristic can comprise a friction factor, a Reynolds number, a density of the fluid, or a combination thereof. In some examples, wherein the fluid characteristic includes a shear stress and a shear rate of the fluid.

In some examples, the pressure sensor can comprise a plurality of pressure sensors (e.g., 2 or more pressure sensors, 3 or more pressure sensors, 5 or more pressure sensors, and the like) arranged at a plurality of locations (e.g., at least 2, at least 3, at least 4, or at least 5 different locations) along the conduit and receiving the one or more differential pressure measurements of the fluid from the plurality of pressure sensors can comprise receiving a one or more pressure measurements of the fluid from the plurality of pressure sensors, and calculating the one or more differential pressure measurements of the fluid from the respective one or more pressure measurements from the plurality of pressure sensors.

In some examples, the processing device can be further configured to generate a plot based on the one or more differential pressure measurements. For example, the processing device can be configured to generate a plot based on the one or more differential pressure measurements and determine the fluid characteristic of the fluid using said plot based on the one or more differential pressure measurements.

In some examples, the processing device can be further configured to generate a plot based on the one or more measured flow rates and the corresponding one or more differential pressure measurements of the fluid. In some examples, the processing device is further configured to produce a logarithmic plot of shear stress at a wall of the conduit versus nominal Newtonian shear rate using the plot based on the one or more measured flow rates and the corresponding one or more differential pressure measurements of the fluid.

In some examples, the processing device can be further configured to determine the fluid characteristic of the fluid using the logarithmic plot of shear stress at a wall of the conduit versus nominal Newtonian shear rate and a rheological model. For example, the processing device can be further configured to determine the transitional Reynolds number of the fluid using the logarithmic plot of shear stress at a wall of the conduit versus nominal Newtonian shear rate. The rheological model can, for example, comprise any model that relates shear stress and shear rate, such as the Yield Power Law model.

In some examples, the flow meter and the pressure sensor are respectively configured to measure the one or more flow rates and the corresponding one or more differential pressures of the fluid flowing within an area inside the conduit. The conduit, for example, can be situated at or above the Earth's surface. In some examples, the conduit can be situated within a wellbore. In certain examples, the flow meter and the pressure sensor are respectively configured to measure the one or more flow rates and the corresponding one or more differential pressure measurements at downhole conditions of the wellbore. In some examples, the conduit can comprise a wired drill pipe.

In some examples, the flow meter and the pressure sensor are respectively configured to measure the one or more flow rates and the corresponding one or more differential pressures of the fluid flowing within an annulus, the annulus of the being a region between the conduit and a wellbore or between the conduit and a second conduit. In some examples, the conduit and the second conduit can be situated within a wellbore. In certain examples, the flow meter and the pressure sensor are respectively configured to measure the one or more flow rates and the corresponding one or more differential pressures at downhole conditions of the wellbore. In some examples, the conduit can comprise a wired drill pipe In some examples of the system, the processing device is further configured to correct the one or more differential pressure measurements of the fluid for eccentricity between the conduit and the wellbore or between the conduit and the second conduit. Correcting for eccentricity between the conduit and wellbore or between the conduit and the second conduit can comprise using any suitable model, such as an equivalent pipe model, a correlation-based model, or combinations thereof.

The details of one or more embodiments are set forth in the description below. Other features, objects, and advantages will be apparent from the description and from the claims and the drawings.

DETAILED DESCRIPTION

Figure 1:
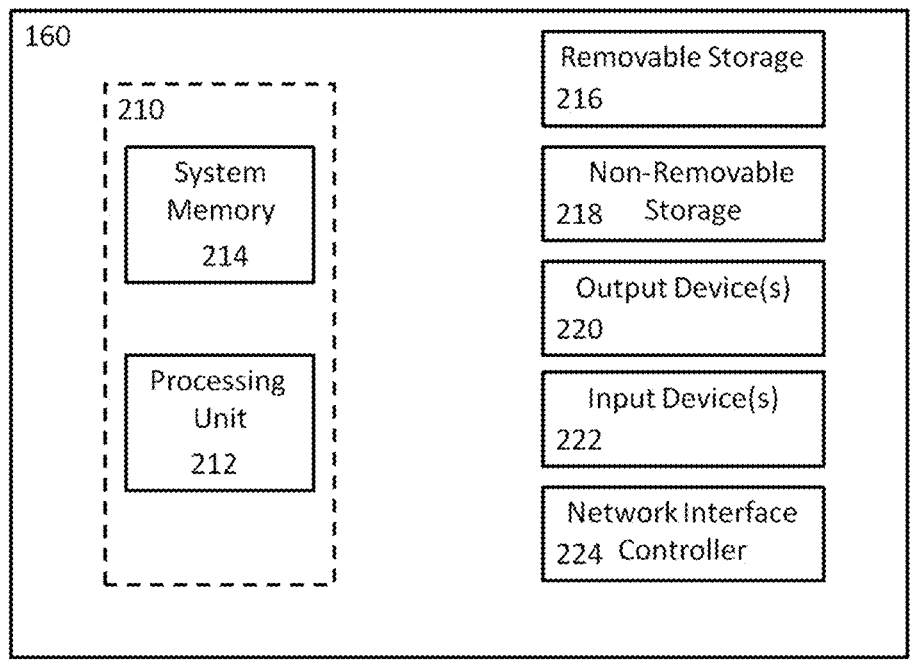
FIG. 1 is a schematic of an exemplary processing device.

Described herein are methods for determining a fluid characteristic of a fluid within a flow region. In some examples, the fluid characteristic can be determined from a shear stress and a shear rate of the fluid. For example, the fluid characteristic can be determined from a relationship between the shear stress and shear rate of the fluid. In some examples, the fluid characteristic can comprise a friction factor, a Reynolds number, a density of the fluid, or a combination thereof. The fluid can comprise a Newtonian fluid or a non-Newtonian fluid. The fluid can comprise any fluid used in a wellbore application such as, for example, a drilling fluid, a spacer fluid, a cementitious fluid, a packer fluid, a completion fluid, a completion brine fluid, a drill-in fluid, or a combination thereof.

The flow region can comprise any region where the fluid can flow and pressure can be measured. In some examples, the flow region comprises an area inside a conduit (e.g., a drill pipe, a wired drill pipe, a tube, or a casing), an annulus, or a combination thereof. The annulus, for example, can comprise a region between the conduit and a wellbore, a region between a bottom-hole assembly and a wellbore, a region between the conduit and a second conduit, or a combination thereof. In certain examples, the conduit and/or the second conduit can be situated at or above the Earth's surface. In certain examples, the conduit and/or the second conduit can be situated within a wellbore. In certain examples, the differential pressure measurements can be obtained at downhole conditions (e.g., downhole temperatures and pressures) of the wellbore. The wellbore can be a vertical wellbore, a deviated wellbore, a horizontal wellbore, or a combination thereof.

The conduit can comprise, for example, a drill pipe, a wired drill pipe, a tube, or a casing. In some examples, the conduit can comprise a wired drill pipe. A wired drill pipe can comprise, for example, a stainless steel, armored coaxial cable that can run between the pin and box within the wired drill pipe. The wired drill pipe can further comprise, for example, induction coils at the pin and box of each connection. In some examples, the wired drill pipe can further comprise electronic elements known as booster assemblies that can boost the data signal as it travels along the wired drill pipe. These booster assemblies can, for example, prevent signal degradation and allow for taking measurements along the entire length of the wired drill pipe.

A high-speed, wired drill-string telemetry network can deliver increased safety, efficiency, reliability and productivity to the drilling industry. The ability to continuously transmit data at high speed (interrupted only while making drill-string connections), completely independent of fluid properties and flow rate (including no flow), allows monitoring of a wide array of well status information.

In a wired drill pipe, for example, an electromagnetic field associated with an alternating current signal transmitted through a cable can transmit data. The alternating electromagnetic field from one coil can induce an alternating current signal in another nearby coil, and thus can allow data to be transmitted from one section of the wired drill pipe to the next. Because the broadband telemetry can work independently from the medium present, the wired drill pipe can transmit data regardless of fluid environment.

The methods can comprise, for example, measuring one or more flow rates and a corresponding one or more differential pressures of a fluid flowing within a flow region to produce one or more measured flow rates and a corresponding one or more differential pressure measurements. In some examples, at least a portion of the one or more measured flow rates and the corresponding one or more differential pressure measurements correspond to the fluid flowing in the flow region in a transitional flow regime (i.e., a critical flow regime), a turbulent flow regime, or a combination thereof. In some examples, the one or more flow rates can include at least 2 (e.g., at least 3, at least 4, at least 5, at least 10, or at least 50) different flow rates.

In some examples, the one or more differential pressure measurements can include at least 2 (e.g., at least 3, at least 4, at least 5, at least 10, or at least 50) different differential pressure measurements. In certain examples, the one or more measured flow rates and the corresponding one or more differential pressure measurements can be obtained at downhole conditions of the wellbore. In some examples, the method further comprises correcting, using the processing device, the respective one or more differential pressure measurements of the fluid for eccentricity between the conduit and the wellbore, or between the conduit and the second conduit. Correcting for eccentricity between the conduit and the wellbore or between the conduit and the second conduit can, for example, comprise using any suitable model, such as an equivalent pipe model, a correlation-based model, or a combination thereof.

In some examples, measuring the one or more differential pressures of the fluid flowing within the flow region can comprise using one or more differential pressure sensor to directly measure the differential pressure of the fluid flowing within the flow region.

In some examples, measuring the one or more differential pressure measurements of the fluid flowing within the flow region can comprise: measuring one or more pressures of the fluid flowing within the flow region using a plurality of pressure sensors at a plurality of locations within the flow region; and calculating, using the processing device, the one or more differential pressure measurements of the fluid flowing within the flow region from the one or more pressure measurements from the plurality of pressure sensors. In some examples, the plurality of pressure sensors can include at least 2 (e.g., at least 3, at least 4, at least 5, at least 10, or at least 50) different pressure sensors. The plurality of locations can, for example, include at least 2 (e.g., at least 3, at least 4, at least 5, at least 10, or at least 50) different locations. In some examples, the plurality of pressure sensors can be arranged along the conduit. In some examples, the plurality of pressure sensors can be arranged along a wired drill pipe.

The methods can further comprise, in some examples, receiving, using a processing device, the one or more measured flow rates and the corresponding one or more differential pressure measurements; storing, using the processing device, the one or more measured flow rates and the corresponding one or more differential pressure measurements; and determining, using the processing device, the fluid characteristic of the fluid using the one or more measured flow rates and the corresponding one or more differential pressure measurements.

In some examples, the methods can further comprise generating a plot based on the one or more measured flow rates, the corresponding one or more differential pressure measurements, or a combination thereof. As used herein, a "plot" can refer to any type of graphic representation of a mathematical function or relationship. For example, a plot can include a plot of a line, a parabola, a hyperbola, and the like, or any combination thereof. In some examples, the plot can comprise a plot of flow (e.g., a plot based on the one or more measured flow rates), a plot of pressure (e.g., a plot based on the one or more differential pressure measurements), a logarithmic plot of shear stress at a wall of the conduit versus nominal Newtonian shear rate, or a combination thereof. In some examples, the method further comprises determining, using the processing device, the fluid characteristic of the fluid from the plot. For example, the generating and determining steps can comprise generating, using the processing device, a plot based on the one or more differential pressure measurements, and determining, using the processing device, the fluid characteristic of the fluid using the plot based on the one or more differential pressure measurements.

In some examples, the method further comprises generating, using the processing device, a plot based on the one or more measured flow rates and the corresponding one or more differential pressure measurements. The plot based on the one or more measured flow rates and the corresponding one or more differential pressure measurements can, for example, be used to produce a logarithmic plot (e.g., a log-log plot, a ln-ln plot, etc.) of shear stress at a wall of the conduit versus nominal Newtonian shear rate. In some examples, the methods can further comprise determining the transitional Reynolds number (i.e., the critical Reynolds number) of the fluid using the plot of shear stress at a wall of the flow region versus nominal Newtonian shear rate. In some examples, the methods can further comprise determining, using the processing device, a flow behavior index for the fluid from the logarithmic plot of shear stress at a wall of the flow region versus nominal Newtonian shear rate. For example, the slope of the logarithmic plot of shear stress at a wall of the flow region versus nominal Newtonian shear rate can comprise the generalized flow behavior index and the intercept of the logarithmic plot of shear stress at a wall of the flow region versus nominal Newtonian shear rate can comprise a generalized consistency index.

In some examples, the fluid characteristic comprises friction factor and Reynolds number, and the method further comprises generating a plot based on the friction factor and Reynolds number. In certain examples, the methods can further comprise determining, using the processing device, a relation between the friction factor and Reynolds number using the plot.

In some examples, the method can further comprise determining, using the processing device, the fluid characteristic of the fluid using the plot of shear stress at a wall of the flow region versus nominal Newtonian shear rate and a rheological model. For example, the methods can further comprise determining, using the processing device, the fluid characteristic of the fluid using the flow behavior index and a rheological model. For example, the method can include determining, using the processing device, the fluid characteristic of the fluid using the flow behavior index determined from the plot of shear stress at a wall of the flow region versus nominal Newtonian shear rate and a rheological model.

The rheological model can comprise any model that can relate shear stress and shear rate. Suitable rheological models include, but are not limited to, the Bingham Plastic model; Casson model; Collins-Graves model; Modified Collins-Graves model; Cross model; Ellis, Lanham and Pankhurst model; Herschel-Bulkley model (Yield Power Law model); Herschel-Bulkley/Linear model; Hyperbolic model; Modified Hyperbolic model; Inverse In-cosh model; Power Law model; Power Law/Linear model; Prandtl-Eyring model; Modified Prandtl-Eyring model; Reiner-Philippoff model; Robertson-Stiff model; Modified Robertson-Stiff model; Sisko model; and Modified Sisko model. In some examples, the rheological model comprises the Yield Power Law model.

Each rheological model can relate shear stress to shear rate through different equations and different parameters as provided, for example, in Weir I S and Bailey W J, "A Statistical Study of Rheological Models for Drilling Fluids," Society of Petroleum Engineers, Dec. 1, 1996, which is incorporated herein by reference for its teaching of rheological models and their parameters. For example, the Bingham Plastic model relates shear stress to shear rate via yield stress and high shear limiting viscosity. The Casson model relates shear stress to shear rate via yield stress and high shear limiting viscosity. The Collins-Graves model relates shear stress to shear rate via yield stress and consistency factor (index) and a constant. The Modified Collins-Graves model relates shear stress to shear rate via yield stress and consistency factor (index) and a constant. The Cross model relates shear stress to shear rate via high shear limiting viscosity and low shear limiting viscosity and a constant. The Ellis, Lanham and Pankhurst model relates shear stress to shear rate via a series of constants. The Herschel-Bulkley model (e.g., Yield Power Law model) relates shear stress to shear rate via yield stress, flow behavior index and consistency factor (index). The Herschel-Bulkley/Linear model relates shear stress to shear rate via a series of constants. The Hyperbolic model relates shear stress to shear rate via a series of constants. The Modified Hyperbolic model relates shear stress to shear rate via a series of constants. The Inverse In-cosh model relates shear stress to shear rate via yield stress and a series of constants. The Power Law model relates shear stress to shear rate via consistency factor (index), and flow behavior index. The Power Law/Linear model relates shear stress to shear rate via consistency factor (index), and flow behavior index. The Prandtl-Eyring model relates shear stress to shear rate via a series of constants. The Modified Prandtl-Eyring model relates shear stress to shear rate via yield stress and a series of constants. The Reiner-Philippoff model relates shear stress to shear rate via high shear limiting viscosity, low shear limiting viscosity, and yield stress. The Robertson-Stiff model relates shear stress to shear rate via consistency factor, flow behavior index, and a constant. The Modified Robertson-Stiff model relates shear stress to shear rate via consistency factor, flow behavior index, and a constant. The Sisko model relates shear stress to shear rate via yield stress and a series of constants. The Modified Sisko model relates shear stress to shear rate via yield stress and a series of constants.

In some examples, the method further comprises receiving, using the processing device, respective times corresponding to each of the one or more differential pressure measurements of the fluid. The method can further comprise generating, using the processing device, a plot of pressure over time based on the one or more differential pressure measurements of the fluid and corresponding times. The method can further comprise estimating, using the processing device, a fluid characteristic of the fluid using the plot of pressure over time.

The methods disclosed herein can be carried out in whole or in part on one or more processing devices. FIG. 1 illustrates a suitable processing device upon which the methods disclosed herein may be implemented. The processing device 160 can include a bus or other communication mechanism for communicating information among various components of the processing device 160. In its most basic configuration, a processing device 160 typically includes at least one processing unit 212 (a processor) and system memory 214. Depending on the exact configuration and type of processing device, the system memory 214 may be volatile (such as random access memory (RAM)), non-volatile (such as read-only memory (ROM), flash memory, etc.), or some combination of the two. This most basic configuration is illustrated in FIG. 1 by a dashed line 210. The processing unit 212 may be a standard programmable processor that performs arithmetic and logic operations necessary for operation of the processing device 160.

The processing device 160 can have additional features/functionality. For example, the processing device 160 may include additional storage such as removable storage 216 and non-removable storage 218 including, but not limited to, magnetic or optical disks or tapes. The processing device 160 can also contain network connection(s) 224 that allow the device to communicate with other devices. The processing device 160 can also have input device(s) 222 such as a keyboard, mouse, touch screen, antenna or other systems configured to communicate with the camera in the system described above, etc. Output device(s) 220 such as a display, speakers, printer, etc. may also be included. The additional devices can be connected to the bus in order to facilitate communication of data among the components of the processing device 160.

The processing unit 212 can be configured to execute program code encoded in tangible, computer-readable media. Computer-readable media refers to any media that is capable of providing data that causes the processing device 160 (i.e., a machine) to operate in a particular fashion. Various computer-readable media can be utilized to provide instructions to the processing unit 212 for execution. Common forms of computer-readable media include, for example, magnetic media, optical media, physical media, memory chips or cartridges, a carrier wave, or any other medium from which a computer can read. Example computer-readable media can include, but is not limited to, volatile media, non-volatile media and transmission media. Volatile and non-volatile media can be implemented in any method or technology for storage of information such as computer readable instructions, data structures, program modules or other data and common forms are discussed in detail below. Transmission media can include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

For example, the processing unit 212 can execute program code stored in the system memory 214. For example, the bus can carry data to the system memory 214, from which the processing unit 212 receives and executes instructions. The data received by the system memory 214 can optionally be stored on the removable storage 216 or the non-removable storage 218 before or after execution by the processing unit 212.

The processing device 160 typically includes a variety of computer-readable media. Computer-readable media can be any available media that can be accessed by device 160 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 214, removable storage 216, and non-removable storage 218 are all examples of computer storage media. Computer storage media include, but are not limited to, RAM, ROM, electrically erasable program read-only memory (EE-PROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by processing device 160. Any such computer storage media can be part of processing device 160.

It should be understood that the various techniques described herein can be implemented in connection with hardware or software or, where appropriate, with a combination thereof. Thus, the methods, systems, and associated signal processing of the presently disclosed subject matter, or certain aspects or portions thereof, can take the form of program code (i.e., instructions) embodied in tangible media, such as floppy diskettes, CD-ROMs, hard drives, or any other machine-readable storage medium wherein, when the program code is loaded into and executed by a machine, such as a processing device, the machine becomes an apparatus for practicing the presently disclosed subject matter. In the case of program code execution on programmable computers, the processing device generally includes a processor, a storage medium readable by the processor (including volatile and non-volatile memory and/or storage elements), at least one input device, and at least one output device. One or more programs can implement or utilize the processes described in connection with the presently disclosed subject matter, e.g., through the use of an application programming interface, reusable controls, or the like. Such programs can be implemented in a high level procedural or object-oriented programming language to communicate with a computer system. However, the program(s) can be implemented in assembly or machine language, if desired. In any case, the language can be a compiled or interpreted language and it may be combined with hardware implementations.

Also disclosed herein are systems for determining a fluid characteristic (e.g., one or more fluid characteristics) of a fluid (e.g., a non-Newtonian fluid, a drilling fluid) within a wellbore. The system can be used to measure a fluid characteristic using the methods described herein. The system, for example, can comprise a conduit; a flow meter configured to measure one or more flow rates of the fluid flowing within the flow region; a pressure sensor configured to measure one or more differential pressures corresponding to the one or more measured flow rates of the fluid flowing within the flow region. The flow region can, for example, comprise an area inside the conduit, an annulus, or a combination thereof. In some examples, at least a portion of the one or more measured flow rates and the corresponding one or more differential pressure measurements correspond to the fluid flowing in the flow region in a transitional flow regime, a turbulent flow regime, or a combination thereof. In some examples, the flow meter can be configured to measure at least 2 (e.g., at least 3, at least 4, at least 5, at least 10, or at least 50) different flow rates. In some examples, the pressure sensor can be configured to measure at least 2 (e.g., at least 3, at least 4, at least 5, at least 10, or at least 50) different differential pressures.

The system can further comprise a processing device. The processing device can be configured to receive the one or more measured flow rates of the fluid from the flow meter; receive the corresponding one or more differential pressure measurements of the fluid from the pressure sensor; store the one or more measured flow rates and the corresponding one or more differential pressure measurements; and determine the fluid characteristic of the fluid using the one or more measured flow rates and the corresponding one or more differential pressure measurements. In some examples, the fluid characteristic can comprise a friction factor, a Reynolds number, a density of the fluid, a temperature of the fluid, or a combination thereof. In some examples, the fluid characteristic includes a shear stress and a shear rate of the fluid.

In some examples, the pressure sensor can comprise a differential pressure sensor that can directly measure the one or more differential pressures of the fluid flowing within the flow region.

In some examples, the pressure sensor can comprise a plurality of pressure sensors (e.g., 3 or more pressure sensors, 4 or more pressure sensors, 5 or more pressure sensors, 10 or more pressure sensors, or 50 or more pressure sensors) arranged at a plurality of locations (e.g., 2 or more locations, 3 or more locations, 4 or more locations, 5 or more locations, 10 or more locations, or 50 or more locations) along the conduit and receiving the one or more differential pressure measurements of the fluid from the plurality of pressure sensors can comprise receiving one or more pressure measurements of the fluid from the plurality pressure sensors, and calculating the one or more differential pressure measurements of the fluid from the respective one or more pressure measurements from the plurality of pressure sensors.

In some examples, the processing device can be further configured to generate a plot based on the one or more measured flow rates, the corresponding one or more differential pressure measurements, or a combination thereof. For example, the processing device can be configured to generate a plot based on the one or more differential pressure measurements and determine the fluid characteristic of the fluid using the plot based on the one or more differential pressure measurements.

In some examples, the processing device can be further configured to generate a plot based on the one or more measured flow rates and the corresponding one or more differential pressure measurements. In some examples, the processing device is further configured to produce a logarithmic plot of shear stress at a wall of the conduit versus nominal Newtonian shear rate.

In some examples, the processing device can be further configured to determine the fluid characteristic of the fluid using the logarithmic plot of shear stress at a wall of the flow region versus nominal Newtonian shear rate and a rheological model. For example, the processing device can be further configured to determine the transitional Reynolds number of the fluid using the logarithmic plot of shear stress at a wall of the conduit versus nominal Newtonian shear rate. The rheological model can, for example, comprise any model that relates shear stress and shear rate, such as the Yield Power Law model.

In some examples, the flow meter and the pressure sensor are respectively configured to measure the one or more flow rates and the corresponding one or more differential pressures of the fluid flowing within an area inside the conduit. The conduit, for example, can be situated at or above the Earth's surface. In some examples, the conduit can be situated within a wellbore. In certain examples, the flow meter and the pressure sensor are respectively configured to measure the one or more flow rates and the corresponding one or more differential pressures at downhole conditions of the wellbore. In some examples, the conduit can comprise a wired drill pipe.

In some examples, the flow meter and the pressure sensor are respectively configured to measure the one or more flow rates and the corresponding one or more differential pressures of the fluid flowing within an annulus, the annulus of the being a region between the conduit and a wellbore or between the conduit and a second conduit. In some examples, the conduit and the second conduit can be situated within a wellbore. In certain examples, the flow meter and the pressure sensor are respectively configured to measure the one or more flow rates and the corresponding one or more differential pressures at downhole conditions of the wellbore. In some examples, the conduit can comprise a wired drill pipe.

In some examples of the system, the processing device is further configured to correct the one or more differential pressure measurements of the fluid for eccentricity between the conduit and the wellbore or between the conduit and the second conduit. Correcting for eccentricity between the conduit and wellbore or between the conduit and the second conduit can comprise using any suitable model, such as an equivalent pipe model, a correlation-based model, or combinations thereof.

In some examples of the system, the processing device can be further configured to: receive one or more differential pressure measurements of the fluid corresponding to respective times; generate a plot of pressure over time based on the one or more differential pressure measurements of the fluid and the corresponding times; and estimate a fluid characteristic of the fluid using the plot of pressure over time.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present disclosure which are apparent to one skilled in the art.

Example 1

Herein, an approach to continuously monitor the drilling fluid rheological parameters at the rig site that can involve minimum maintenance efforts is discussed. The method can, in some examples, use a pipe viscometer approach. Additional inputs for hydraulic models, such as mud density, transition to turbulent flow (critical Reynolds number), and real-time friction factor for non-Newtonian drilling and completion fluids can also be obtained using a pipe viscometer. A fully automated device for use in this system is also discussed.

The device was tested with several weighted and unweighted mud systems. During the measurement process, the driving pump was ramped up and held intermittently at various flow rates to measure the laminar frictional pressure loss in the pipe section. The data thus obtained was analyzed by software that generated a logarithmic plot of shear stress at a wall of the flow region versus nominal Newtonian shear rate and from it derived relevant mud rheological parameters using a suitable rheological model. The turbulent flow regime as also tested to obtain the friction factor in real-time for each particular fluid, rather than relying on a limited number of correlations that quite often exhibit inaccurate results, particularly for the Yield Power Law (YPL) fluids. Several tests with different mud systems indicate the reliability and robustness of the proposed technique.

This approach is a step towards achieving an effective fully automated system for mud rheology measurement, mud maintenance, and real-time management of equivalent circulating density (ECD) without any direct human interaction. The simple equipment set up and its fully automated measurement and data analysis processes make it highly suitable for field application.

Standards for drilling fluid characterization, particularly those contained in API Standards 13B-1 & 2, have served the industry well for decades (American Petroleum Institute Specifications API 13A, 1993. Specification for Drilling Fluid Materials; American Petroleum Institute Specifications API 13B-1, 2003. Field Testing Water-based Drilling Fluids). However, many of the measurement test protocols do not reflect current state-of-the-art tool and sensor design, data acquisition and data-analysis techniques, etc. (Karimi Vajargah A and van Oort, E. Journal of Natural Gas Science and Engineering, 2015, 24, 400-411). For instance, rotational type rheometers are still widely used in the oil and gas industry to determine the flow character of drilling fluids. Traditional measurements are usually conducted at atmospheric pressure using test protocols standardized by API 13 B-1 and API 13 B-2. Traditional measurements usually depend on the availability of the mud engineer and are only conducted only a few times during a 24-hour period during so-called "mud checks". Often, a full mud check with determination of all relevant rheological parameters is only carried out once a day, which is then augmented with one or two partial checks in the 24-hour period. Therefore, many critical downhole decisions made by operators are based on drilling fluid data that could be up to 24-hours old (Broussard S et al. Society of Petroleum Engineers, Abu Dhabi International Petroleum Exhibition and Conference, Nov. 1-4, 2010, SPE-137999-MS). When applying a rotational rheometer at the rig site, quite often shear stress readings at only two shear rates (e.g., 300 and 600 rpm) are used to characterize the fluid, which may result in oversimplified values for fluid rheological parameters and hence poor hydraulic management. Accurate determination of rheological parameters is crucial during complex drilling operations, where a correct calculation of the frictional pressure losses and the associated equivalent circulating density (ECD) is vital.

Herein, a continuous, automated monitoring of drilling fluid rheological parameters is discussed. Continuous monitoring of the drilling fluid rheology can result in prevention and/or early detection of some potential drilling problems, such as those associated with drilling fluid contamination, wellbore cleaning, wellbore instability, etc. In addition, continuous monitoring can alleviate sensitivity to sampling issues that plague current measurement methods. Moreover, the rheology of a drilling fluid that is being circulated through a well can change due to several factors such as the application of shearing forces, variations in pressure and temperature, introduction of drilling cuttings, contaminants, etc. Continuous monitoring can allow for real-time evaluation and management of these changes.

With recent introduction of advanced technologies such as managed pressure drilling (MPD) and dual gradient drilling (DGD), frequent and accurate measurement of drilling fluid rheological properties, density, critical Reynolds number, and turbulent friction factor are becoming even more important and necessary. The sophisticated hydraulics models, which are used in managed pressure drilling and dual gradient drilling control operations, are only as good as their input parameters, and the parameters that matter the most are those associated with rheology, density, and friction factors.

So far, most of the attempts to automate drilling fluid rheological property measurement have merely tried to automate the conventional measurement devices, presumably out of habit and respect for the API standards (Stock T et al., Society of Petroleum Engineers, SPE Intelligent Energy International, 27-29 March, 2012, Utrecht, The Netherlands, SPE-150439-MS; U.S. Pat. No. 4,557,142). No method has yet been proposed for real-time determination of friction factor of non-Newtonian drilling fluids in the turbulent flow regime.

Herein, an approach based on pipe viscometer theory to continuously and automatically measure the drilling fluids rheological properties, density, transitional Reynolds number and friction factor in real-time at the rig site or mud plant is discussed. A device was constructed and tested with several types of non-Newtonian drilling fluids.

Several types of viscometers are available to measure drilling fluid rheological properties. Herein, a pipe viscometer was used to measure the drilling fluid rheological parameters in real-time at the rig site or mud plant. Pipe viscometers can be more reliable and have better accuracy than rotational viscometers (Ahmed R and Miska S Z. Advanced wellbore hydraulics, chapter 4.1, pages 191-219, Advanced drilling and well technology, USA Society of Petroleum Engineers, Ed. Bernt S. Aadnoy. SPE, 2009).

Figure 2:
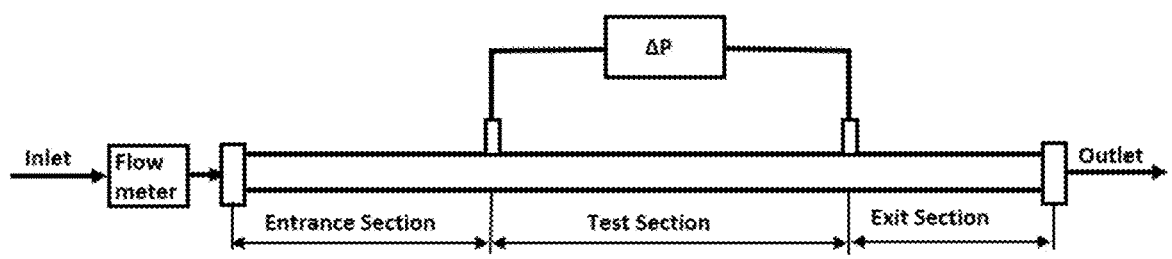
FIG. 2 is a schematic of a pipe rheometer system.
Figure 3:
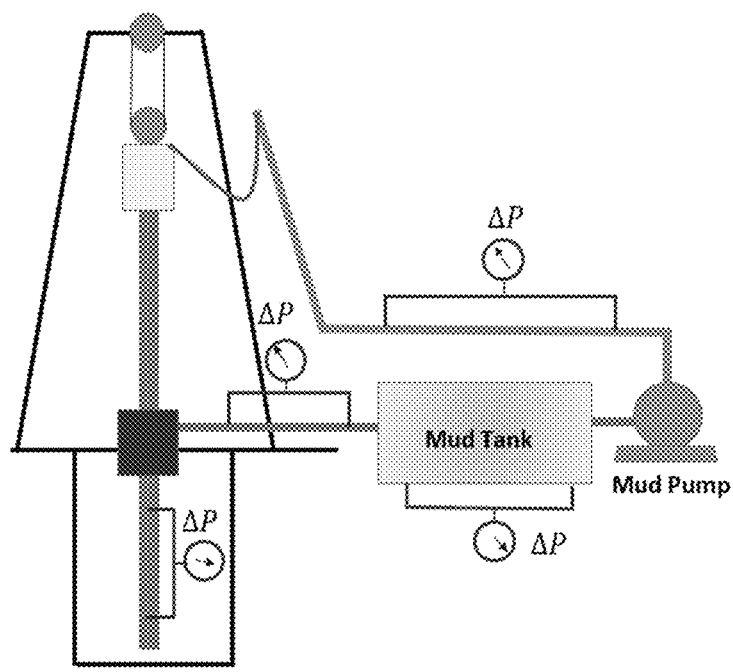
FIG. 3 is a schematic showing potential locations to install a pipe viscometer in the field.

A standard pipe viscometer system (FIG. 2) employs instrumentation for flow rate and pressure-loss measurements. The pipe viscometer can be installed at several possible locations at the rig site. One example is to install the pipe viscometer right after the main mud pump and before the standpipe (FIG. 3). In this case, when the pump is staged either up or down, pressure loss can be measured at several flow rates, which then can be used to determine rheological properties, as outlined below. An advantage of this method is that measurements can be done at elevated pressure when the fluid has been energized by the mud pumps.

Figure 4:
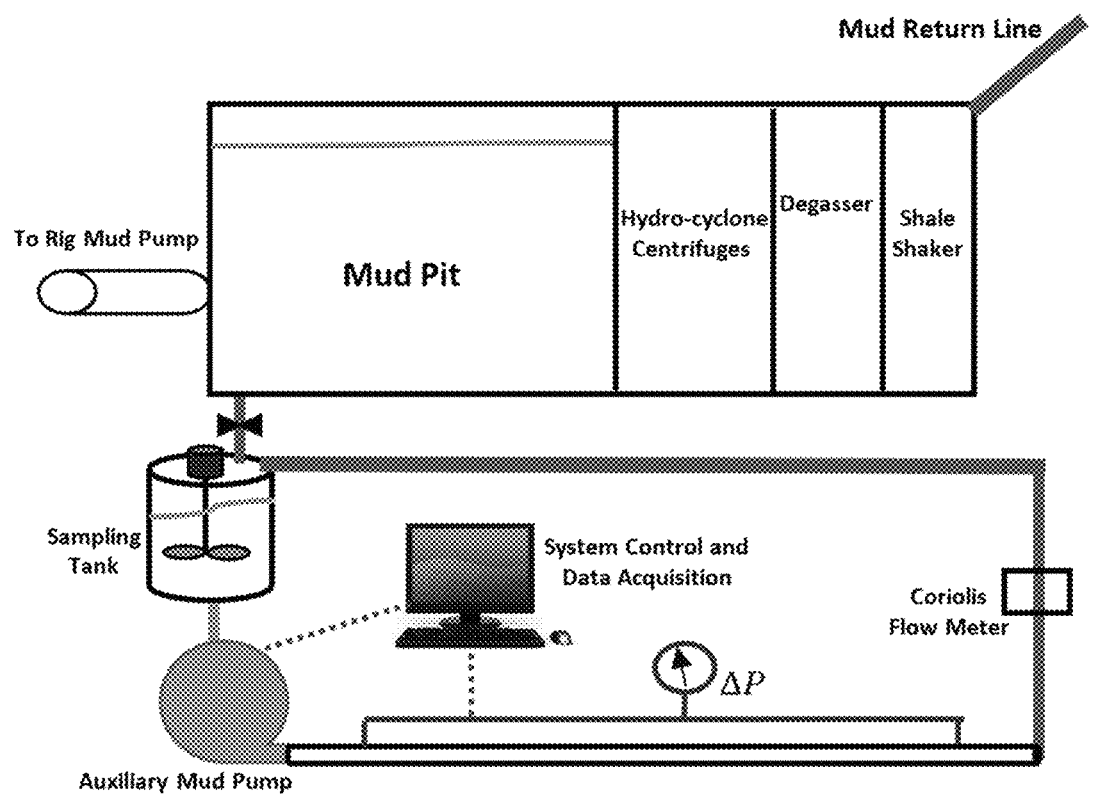
FIG. 4 is a schematic of a pipe viscometer installed alongside the mud pits (applicable to the field and also mud plants). An auxiliary pump and an accurate mass flow meter (e.g., Coriolis) are included in this set up.

Another possibility is to install a sampling system (including a sampling port and a tank) and pipe viscometer before the main pump (FIG. 4) or, in another example, alongside the array of mud pits on a drilling rig. In some examples, the preferred location is after the mud pits, where drilling fluid has been processed and cleaned (by shale shakers, hydrocyclones (desanders and desilters), degassers, and centrifuges) such that the pipe viscometer lines will not become plugged up with solids. This set up relies on a separate auxiliary pump that can be automated to apply a series of stepped flow rates, in order to measure the pressure loss at each flow rate and to calculate the rheological properties. Since such a set up does not rely on the main mud pumps, it can be used regardless of mud pump utilization or ongoing rig operation.

In the method discussed herein, frictional pressure loss is recorded at several flow rates covering laminar and turbulent flow regimes. Fluid rheological parameters are subsequently determined from the differential pressure data for laminar flow. Usually, pipe viscometer data is expressed in terms of wall shear stress, $\tau_w$, versus nominal Newtonian shear rate, $8v/D$, on a ln-ln plot. In laminar flow, wall shear stress can be obtained when the differential pressure across the measurement section is known according to Equation 1:

$$\tau_w = \frac{D}{4}\frac{dp}{dl} \qquad \text{Eq. 1}$$

where $\tau_w$ is the shear stress at the wall in Pa, D is diameter in meters, p is pressure in Pa, and l is length in meters. For pipes, shear rate at the wall can be obtained from Equation 2 (Ahmed R and Miska S Z, Advanced wellbore hydraulics, chapter 4.1, pages 191-219, Advanced drilling and well technology. USA Society of Petroleum Engineers. Ed. Bernt S. Aadnoy. SPE, 2009):

$$\dot{\gamma}_w = \frac{1}{4}\left[3 + \frac{d\left(\ln\frac{8v}{D}\right)}{d(\tau_w)}\right]\left(\frac{8v}{D}\right) \qquad \text{Eq. 2}$$

where $\dot{\gamma}_w$ is the shear rate at the wall in s$^{-1}$, $\tau_W$ is the shear stress at the wall in Pa, D is diameter in meters, and v is velocity in meters per second (m/s). Introducing the generalized flow behavior index, N as Equation 3:

$$N = \frac{d(\ln \tau_w)}{d\left(\ln\frac{8v}{D}\right)} \qquad \text{Eq. 3}$$

Equation 2 is now rewritten as Equation 4:

$$\dot{\gamma}_w = \left(\frac{3N+1}{4N}\right)\frac{8v}{D} \qquad \text{Eq. 4}$$

According to Equation 3, the slope of the plot of $\ln \tau_w$ vs. $\ln(8v/D)$ represents the generalized flow behavior index, N. Once N is obtained from the plot of $\ln \tau_w$ vs. $\ln(8v/D)$, the shear rate at the wall can be calculated by using Equation 4. Subsequently, rheological parameters for any desired rheological model can be obtained by plotting the shear stress at the wall vs. shear rate at the wall and applying an appropriate fitting technique. The most commonly used rheological models in the drilling industry are: the Bingham Plastic model, Power Law (PL) model, Yield Power Law (YPL) model, and Casson's model. The Yield Power Law model, also known as the Herschel-Bulkley model, exhibits an acceptable accuracy for the majority of drilling, completion, and cementing fluids, and is therefore used herein (Equation 5):

$$\tau = \tau_y + K\left(-\frac{dv}{dr}\right)^m \qquad \text{Eq. 5}$$

where $\tau$ is shear stress in Pa, $\tau_y$ is yield stress in Pa, K is the consistency index in Pa·s$^m$, v is velocity in meters per second, r is radius in meters, and m is the fluid behavior index.

When yield stress, $\tau_y$, is negligible or zero, the Yield Power Law model is the same as the Power Law model. Additionally, when m is equal to one, the Yield Power Law model is the same as the Bingham Plastic model. It should be noted that although the use of circular pipe suggests one of the simplest geometry for a pipe viscometer, the method can still be applied for annuli or flow channels of arbitrary shapes (Karimi Vajargah A and van Oort E. Society of Petroleum Engineers, SPE/IADC Drilling Conference and Exhibition, London, England, United Kingdom, Mar. 17-19, 2015, SPE-173085-MS). When annulus geometry is used, factors such as the effect of eccentricity, pipe rotation, buckling, should also be accounted for (Erge O et al. Society of Petroleum Engineers, IADC/SPE Drilling Conference and Exhibition, 4-6 March, 2014, Fort Worth, Tex., USA, SPE-167950-MS; Erge O et al. Journal of Natural Gas Science and Engineering, 2015, 26, 1119-1129; Erge O et al. Society of Petroleum Engineers, IADC/SPE Drilling Conference and Exhibition, 1-3 March, 2016, Fort Worth, Tex., USA, SPE-178785-MS).

Several factors, such as rheological complexity of the fluid and turbulent eddies, make mathematical modeling of turbulent flow of non-Newtonian fluids complicated. To overcome this complexity, a friction factor term is usually introduced. The pressure loss equation in terms of friction factor (f) can be expressed as Equation 6:

$$\frac{dp}{dl} = \frac{2 f \rho v^2}{D} \qquad \text{Eq. 6}$$

where p is pressure in Pa, l is length in meters, $\rho$ is density in kg/m³, v is velocity in m/s, and D is diameter in meters. For laminar flow in pipes, the friction factor (f) follows Equation 7:

$$f = \frac{16}{Re} \qquad \text{Eq. 7}$$

where Re is Reynolds number. For turbulent flow, empirical correlations have been developed to obtain the friction factor. Several correlations have been proposed to obtain the friction factor for turbulent flow of Newtonian fluids in pipes (Colebrook R A. Journal of the Institute of Civil Engineering, 1939, 11, 133-156; Blasius H. VDI Mitteilungen Forschungsarbeit Gebiete Ingenieurs, 1913, 131, 1-34), but only a few robust experimental studies have been carried out for non-Newtonian fluids. Dodge and Metzner proposed a semi-empirical friction factor correlation (Equation 8) for turbulent flow of non-Newtonian fluids in smooth pipes for time-independent and non-elastic fluids (Dodge D W and Metzner A B. AIChE J. 1959, 5(2), 189-204):

$$\frac{1}{\sqrt{f}} = \frac{4}{m^{0.75}} \log\left(Re \times f^{\left(1-\frac{m}{2}\right)}\right) - \frac{0.4}{m^{1.2}} \qquad \text{Eq. 8}$$

Although this correlation (Equation 8) provides a reasonable level of accuracy for some drilling fluids, it performs very poorly for polymer based drilling. Considering the complexity of non-Newtonian drilling fluids, it is therefore highly preferred to actually measure and obtain the friction factor in real-time for a particular mud system, rather than rely on empirical correlations, which only are valid under certain conditions. The proposed pipe viscometer set up allows the flow rate to be increased to reach a fully turbulent flow regime. Turbulent pressure loss can then be measured and the friction factor can be obtained from Equation 6. A fitting technique may subsequently be used to find a mathematical relationship between the Reynolds number and friction factor. An accurate determination of the friction factor can be important in applications such as managed pressure drilling and dual gradient drilling or, for non-drilling applications, hydraulic fracturing, which can require precise values of pump pressure, frictional pressure drop, and equivalent circulating density.

As mentioned above, the friction factor depends on the flow regime (laminar flow or turbulent flow). In order to establish the flow regime, the critical Reynolds number for the transition from laminar flow to turbulent flow must be characterized (Ahmed R and Miska S Z. Advanced wellbore hydraulics, chapter 4.1, pages 191-219, Advanced drilling and well technology, USA Society of Petroleum Engineers, Ed. Bernt S. Aadnoy. SPE, 2009). Although the critical Reynolds number of approximately 2100 is extensively used for all Yield Power Law fluids (note that the Reynolds number is dimensionless), some fluids (especially the ones that exhibit viscoelastic behavior) tend to delay the transition from laminar to turbulent flow so the critical Reynolds number may be different for these fluids. Therefore, the best approach is to actually measure the critical Reynolds number for each fluid in the field, rather than rely on different model values or a generic value for different types of drilling fluids. This can be done by plotting wall shear stress, $\tau_w$, vs. nominal Newtonian shear rate 8v/D, and by careful examination of the trend of the data points in order to identify a sharp increase in wall shear stress as nominal Newtonian shear rate increases (Ahmed R and Miska S Z. Advanced wellbore hydraulics, chapter 4.1, pages 191-219, Advanced drilling and well technology, USA Society of Petroleum Engineers, Ed. Bernt S. Aadnoy. SPE, 2009). In addition, when a Coriolis flow meter is used for measuring flow rate, fluid density can also be obtained. Mud weight can have a significant impact on hydraulic calculations and estimating the bottom-hole pressure and equivalent circulating density, therefore precise knowledge of the mud weight and fluid density is therefore highly desirable.

A pipe viscometer device was constructed (FIG. 5) for automation and real-time measurement of experimental data. The main measurement section of the device is approximately 5.5 m (18 ft) long and is comprised of two pipe sections, that are 1.27 cm (0.5") and 0.9525 cm (0.375") in diameter, respectively. Wall thickness for both pipes is 0.89 mm (0.035"). The test section between two pressure transducers for both pipes is 3.048 m (10 ft) long. The pressure data was obtained by using two differential pressure transducers. The entrance and exit lengths were estimated based on empirical correlations from literature (Collins M and Schowalter W R., AIChE Journal, 1963, 9(6), 804-809).

A positive displacement (Moyno) pump was used for fluid circulation. Fluid volume for circulation was handled in a 40-liter (10.57 gallon) reservoir tank. A Coriolis flow meter was installed at the inlet of the supply line, for measuring fluid density, flow rate, and temperature. A fully automated control and data acquisition system was installed for this flow loop. Parameters such as flow rate, temperature, differential pressure, and pump frequency were monitored during the test. Most of the experiments were conducted at room temperature. This, however, is not necessarily a limitation of the test method: muds can be pre-heated before being pumped through the pipe section to study rheological parameters at elevated temperature (which usually has a larger effect than pressure).

Figure 5:
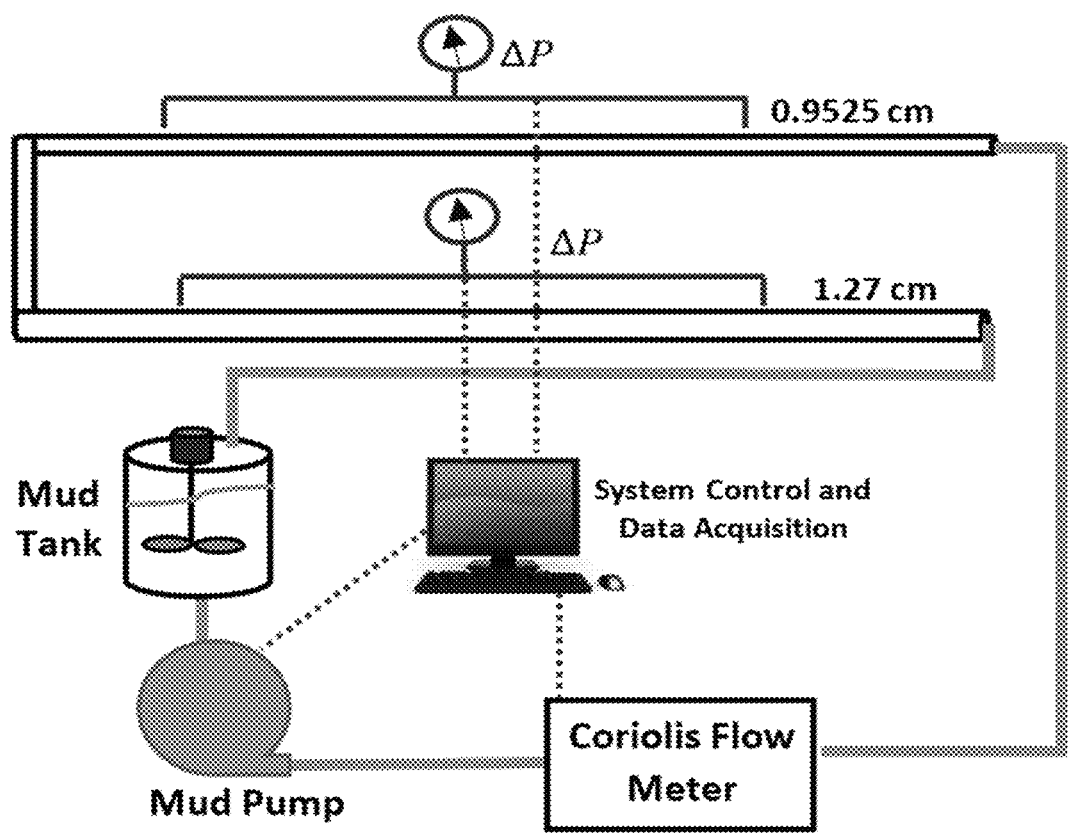
FIG. 5 is a schematic of a fully automated pipe viscometer.

During the data acquisition process, flow rate was ramped up by a stepwise increase in the pump frequency. Each frequency was maintained for a pre-determined period (one minute in this study) until flow rate and pressure loss readings stabilized and transient effects diminished. Fluid density and temperature were also recorded. Then, pressure loss vs. flow rate readings were transmitted to the processing software and after conducting calculations, fluid rheological parameters, critical Reynolds number, friction factor vs. Reynolds number, temperature, and average fluid density were reported. Subsequently, these values were updated in the real-time hydraulic software and new values for the frictional pressure loss and equivalent circulating density were obtained for a hypothetical wellbore. FIG. 5 shows the schematics and different components of the experimental set up.

Figure 6:
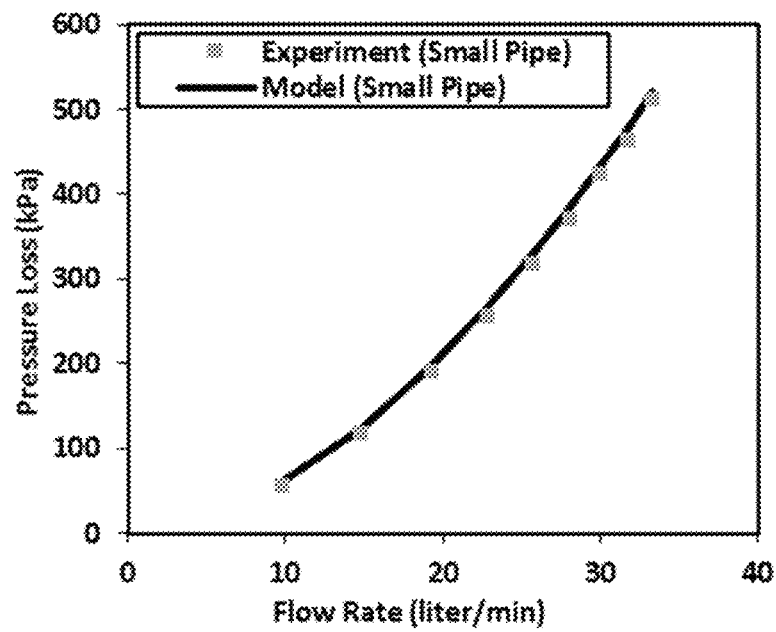
FIG. 6 is a plot of flow rate vs. pressure loss for a validation test of the automated pipe viscometer with water for a small pipe (0.9525 cm outer diameter).
Figure 7:
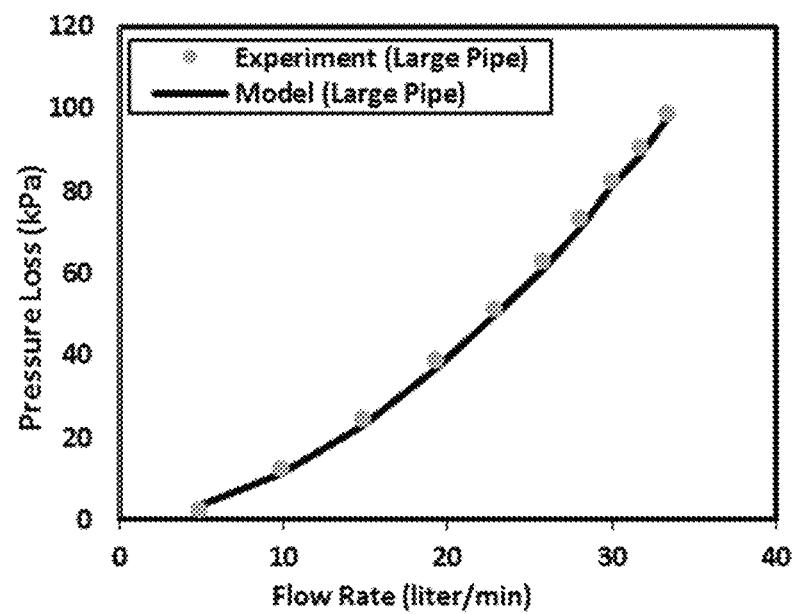
FIG. 7 is a plot of flow rate vs. pressure loss for a validation test of the automated pipe viscometer with water for a larger pipe (1.27 cm outer diameter).

Calibration tests were conducted with water for both pipes to verify the pressure loss readings. These test results were compared with the analytical solution for flow of a Newtonian fluid (water) in pipes. The friction factor was obtained by using the Colebrook's correlation (Colebrook C F. Journal of the Institute of Civil Engineering, 1939, 11, 133-156). As shown in FIG. 6 and FIG. 7, excellent agreement was achieved between the analytical model and the experimental results in both pipes.

Next, four non-Newtonian drilling fluids (labeled mud A, mud A*, mud B, and mud C) were tested. Muds A and A* were bentonite clay suspensions, mud B was polymer based, and mud C was a synthetic based drilling fluid. Table 1 presents the composition and density of muds A, A* and B. Mud C was a 1369 kg/m³ (11.4 ppg) field mud.

TABLE 1

Composition and density of the test fluids (1 gr/350 cc = 1 lb/bbl).

| Test Fluid | Composition (gr/350 cc) | | | | | Density (kg/m³) |
|---|---|---|---|---|---|---|
| | Water | Bentonite | Pac R | Barite | Drilling cuttings | |
| Mud A | 329 | 24 | 0 | 45 | 0 | 1138 |
| Mud A* | 329 | 29 | 0 | 45 | 15 | 1165 |
| Mud B | 337 | 0 | 2.2 | 48 | 0 | 1105 |

Figure 8:
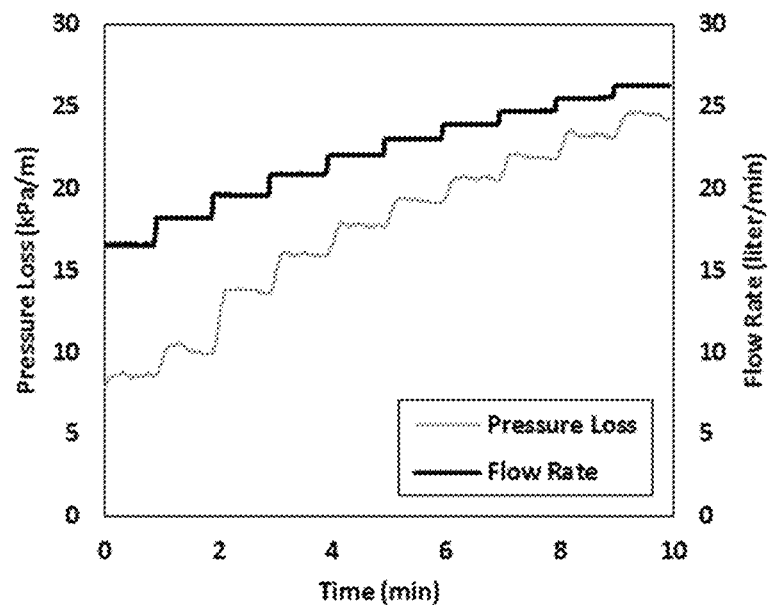
FIG. 8 is a plot of the flow rate and corresponding pressure loss for mud A (bentonite mud) determined using the fully automated pipe viscometer.
Figure 9:
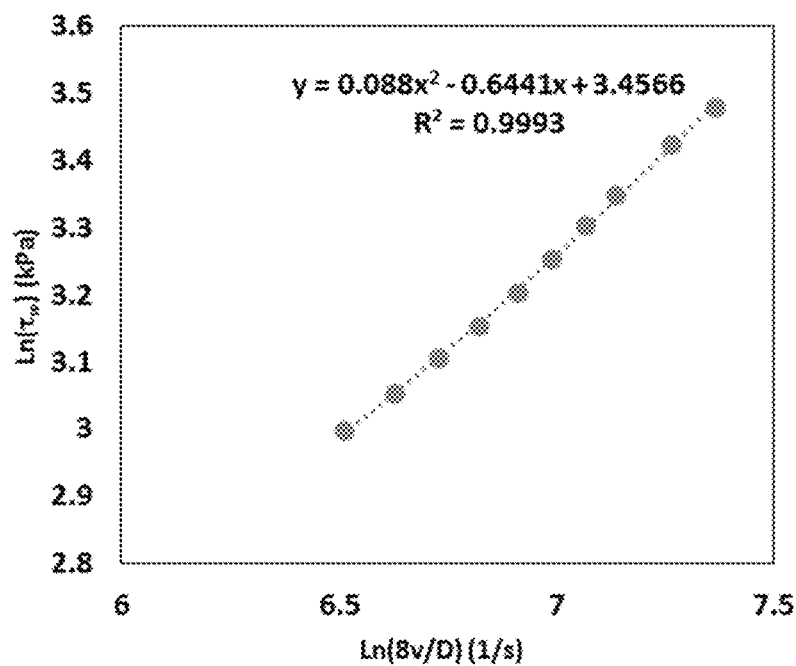
FIG. 9 is a logarithmic plot of shear stress at a wall of the conduit versus nominal Newtonian shear rate for mud A (bentonite mud).

FIG. 8 shows the flow rate and the corresponding pressure drop readings vs. time for mud A (a bentonite suspension) in the larger 1.27 cm (0.5") pipe. From this plot, the average pressure gradient and shear stress at the wall were obtained at each flow rate. Then, the plot of ln $\tau_w$ vs. ln(8/D) was generated and a second order polynomial was fitted to the data points (FIG. 9). The slope of this plot (first derivative) represents the generalized flow behavior index, N, as given by Equation 3. The shear rate at the wall was then obtained from Equation 4. By knowing the shear rate and shear stress at the wall, any rheological model and a proper fitting technique can be used to obtain the rheological parameters. In this study, the Yield Power Law model (also known as the Herschel-Bulkley model) was applied. Table 2 presents the detailed calculations for mud A. The same methodology was applied to obtain the rheological parameters for muds B and C.

TABLE 2

Detailed calculations for mud A.

| Flow Rate (liter/sec) | Velocity (m/s) | Pressure Loss (Pa/m) | $\tau_w$ (Pa) | 8 v/D (1/s) | RE | N | $\dot{\gamma}_w$ (1/s) |
|---|---|---|---|---|---|---|---|
| 0.0751 | 0.801 | 7002.0 | 19.12 | 587.0 | 302.4 | 0.478 | 747.4 |
| 0.0861 | 0.919 | 7332.2 | 20.02 | 673.4 | 379.9 | 0.502 | 840.3 |
| 0.0968 | 1.033 | 7757.5 | 21.18 | 756.7 | 453.5 | 0.523 | 929.6 |
| 0.107 | 1.145 | 8174.6 | 22.32 | 838.6 | 528.6 | 0.541 | 1016.7 |
| 0.118 | 1.255 | 8578.6 | 23.42 | 919.0 | 604.9 | 0.557 | 1101.9 |
| 0.128 | 1.371 | 9022.5 | 24.64 | 1003.9 | 686.2 | 0.572 | 1191.4 |
| 0.139 | 1.485 | 9474.4 | 25.87 | 1087.8 | 767.2 | 0.586 | 1279.5 |
| 0.150 | 1.603 | 9974.8 | 27.24 | 1174.1 | 849.0 | 0.600 | 1369.8 |
| 0.161 | 1.719 | 10417.7 | 28.45 | 1258.9 | 934.7 | 0.612 | 1458.3 |
| 0.183 | 1.951 | 11250.1 | 30.72 | 1429.1 | 1115.3 | 0.635 | 1634.9 |
| 0.202 | 2.158 | 11879.9 | 32.44 | 1580.6 | 1291.9 | 0.652 | 1791.3 |
| 0.221 | 2.361 | 12818.2 | 35.00 | 1729.1 | 1432.9 | 0.668 | 1943.9 |

Figure 10:
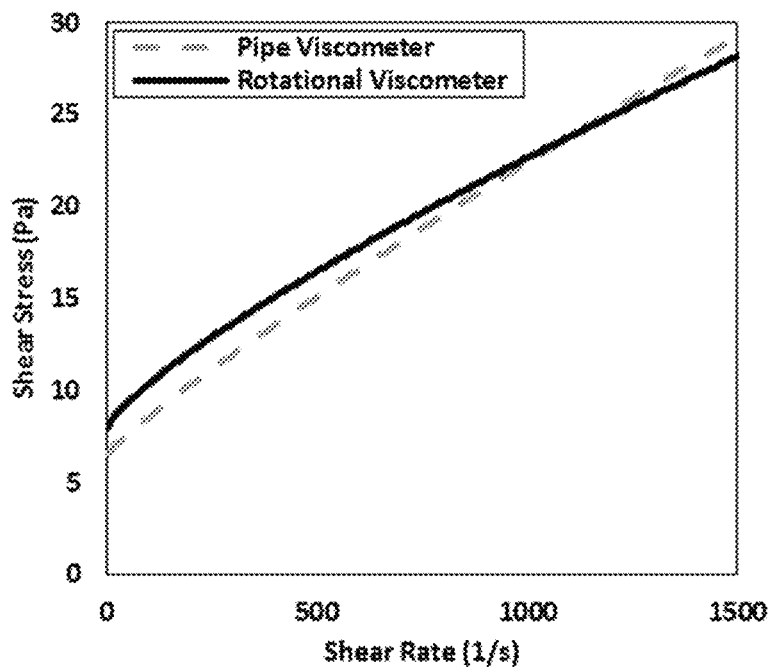
FIG. 10 shows a comparison of the rheograms obtained from the pipe viscometer with rotational results for mud A.
Figure 11:
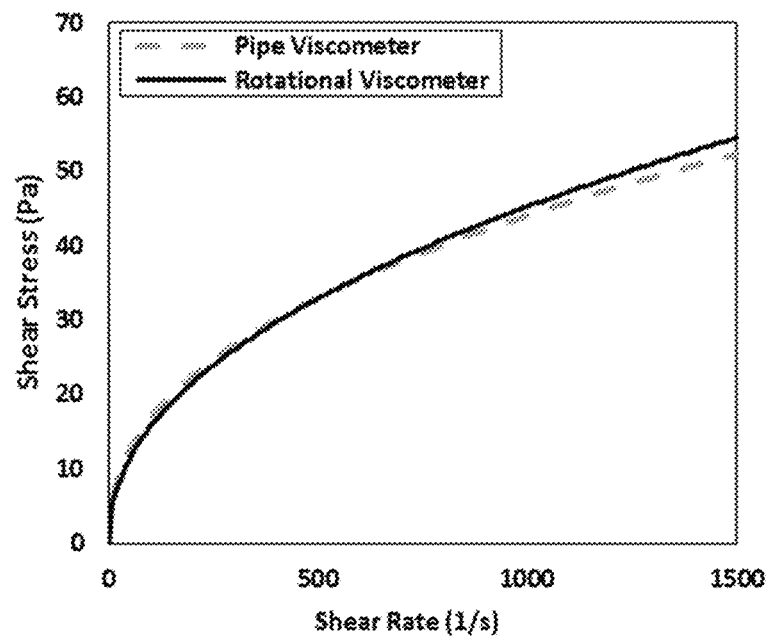
FIG. 11 shows a comparison of the rheograms obtained from the pipe viscometer with rotational viscometer results for mud B.
Figure 12:
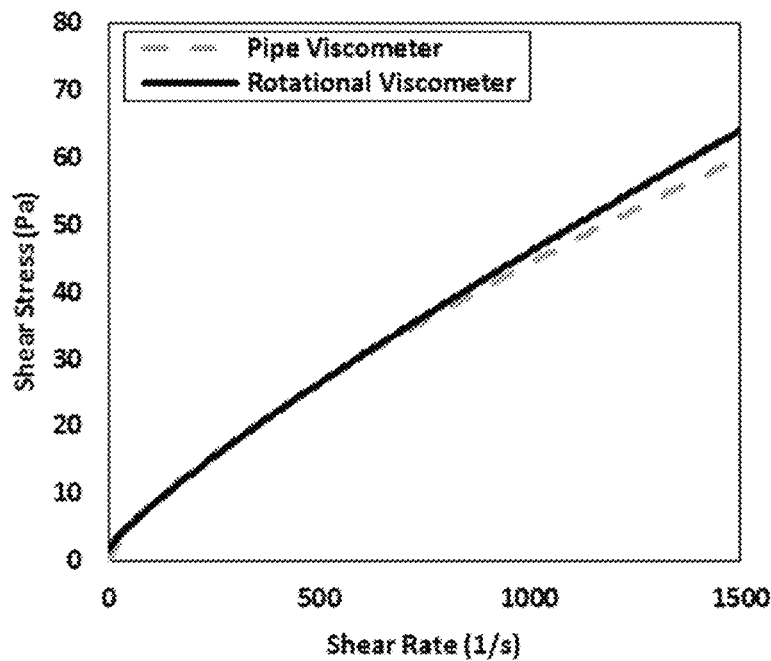
FIG. 12 shows a comparison of the rheograms obtained from the pipe rheometer viscometer with rotational viscometer results for mud C.

A rotational viscometer was used to obtain comparative rheology data for the pipe viscometer. FIG. 10 compares the rheogram (shear stress vs. shear rate plot) obtained from the pipe viscometer with the rotational viscometer results for mud A. FIG. 10 indicates that although two different approaches were used to obtain the rheogram, the outcomes are relatively similar. FIG. 11 and FIG. 12 compare the rheogram obtained from the pipe viscometer with rotational viscometer for muds B (polymer-based mud) and C (Synthetic-Based Mud (SBM)) respectively. Close agreements between the plots in FIG. 11 and FIG. 12 indicate that the pipe viscometer approach can also be used for these drilling fluids. Table 3 compares the rheological parameters of the Yield Power Law model (yield stress ($\tau_y$), consistency index (k), and fluid behavior index (m)) obtained from the pipe viscometer (larger pipe with outer diameter of 1.27 cm in FIG. 5) with rotational viscometer values for each fluid. These values were used to construct the rheogram for each fluid. It should be noted that mud B has a negligible yield stress and hence the Power Law model could be used (the Yield Power Law model reduces to Power Law when yield stress is negligible) for this fluid. Acceptable results for several muds indicate that the proposed methodology is robust and may be applied for different types of drilling fluids.

TABLE 3

Rheological parameters of the Yield Power Law model (yield stress ($\tau_y$), consistency index (k), and fluid behavior index (m)) obtained from the pipe viscometer (larger pipe with outer diameter of 1.27 cm in FIG. 5) with rotational viscometer values.

| | Rotational Viscometer | | | Pipe Viscometer | | |
|---|---|---|---|---|---|---|
| | k | m | $\tau_y$ | k | m | $\tau_y$ |
| Mud A | 0.06292 | 0.789 | 8.001 | 0.03438 | 0.8879 | 6.525 |
| Mud B | 1.900 | 0.4591 | 0.000 | 2.430 | 0.4197 | 0.000 |
| Mud C | 0.1284 | 0.8456 | 1.736 | 0.1753 | 0.7912 | 2.924 |

While the pipe viscometer and rotational viscometer gave nearly identical results for all muds tested herein, there is a practical distinction between the two methods. In comparison with the rotational viscometer, a pipe viscometer provides much better opportunities for automation. The small fluid space between the rotor and the bob of a rotational viscometer can plug up easily when solid particles or dehydrated mud get stuck in it, requiring manual cleaning and maintenance. This is far less likely with a pipe viscometer, provided a sufficiently large pipe diameter is used (for example, for field applications, a diameter greater than 1" and a pipe section greater than 20 ft is advised). Furthermore, the pipe viscometer set-up used herein allows for additional variables to be obtained, such as the fluid's density, temperature, critical Reynolds number, and real-time friction factor.

Figure 13:
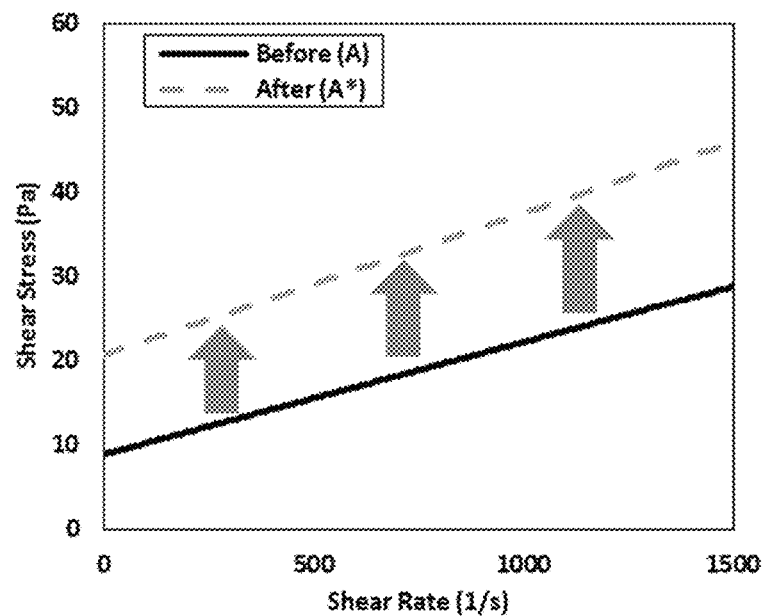
FIG. 13 shows the results of monitoring the rheological properties of mud A in real-time. Bentonite and drill cuttings are added to mud A and changes the rheological properties and density were measured (mud A*).

With the pipe viscometer set up, it is possible to monitor changes in drilling fluid properties within minutes. Therefore, a) any undesirable changes in mud properties (such as water kicks, barite sag, contamination, etc.) can be observed, b) it eases the automated mud mixing process and could be of great value for mud plants, c) it makes the real-time hydraulic concept meaningful by providing the ability to alert a user immediately when changes in mud properties happen. In order to demonstrate the real-time identification and alerting capability of the current set up in the case of simple solids contamination (a routine occurrence in field operations when muds are not optimally maintained), the bentonite concentration was increased on the fly from 24 lb/bbl to 29 lb/bbl. In addition, 15 lb/bbl of drilled solids in the form of OCMA clay was also added to mud A. FIG. 13 shows the properties of the new contaminated mud, A*, in comparison with the old mud, A. FIG. 13 indicates that mud A* is more viscous than mud A. In addition, mud weight increased from 1138 kg/m³ (9.48 ppg) to 1165 kg/m³ (9.70 ppg) as a result of adding solids to the mud. The changes become apparent in minutes while the pipe viscometer ran through its automation cycles, without any human intervention, demonstrating that adverse changes in mud rheological properties and density can be observed in real-time (e.g., with only minutes delay), meaning that proper corrective action can be taken almost immediately. There are benefits of this capability both for mixing muds in mud plants as well as mixing and maintaining muds in the field during ongoing drilling operations. The real-time monitoring capability adds an important safety element to operation, especially when drilling through zones prone to contaminating the mud (e.g. gas or brine flow zones), as even small changes in mud rheology can immediately be picked up.

As mentioned earlier, the critical Reynolds number (characterizing the end of the laminar flow region) can be determined by plotting wall shear stress vs. nominal Newtonian shear rate (ln $\tau_w$ vs. ln(8v/D)) and identifying a point of inflection. At the end of laminar flow regime, a sharp increase in wall shear stress is expected. Wall shear stress vs. nominal Newtonian shear rate is plotted for muds A and B in FIG. 14 and FIG. 15, respectively.

Figure 14:
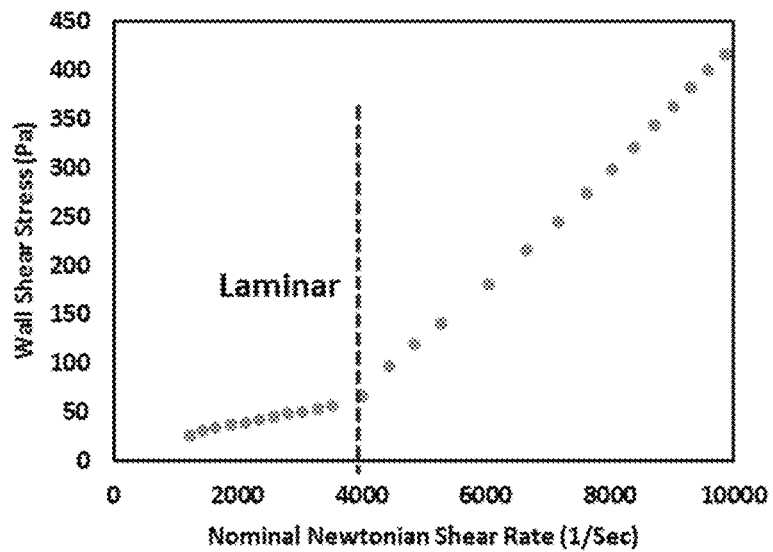
FIG. 14 shows the fluid transition from laminar flow for mud A (data obtained from the small pipe (0.9525 cm outer diameter).
Figure 15:
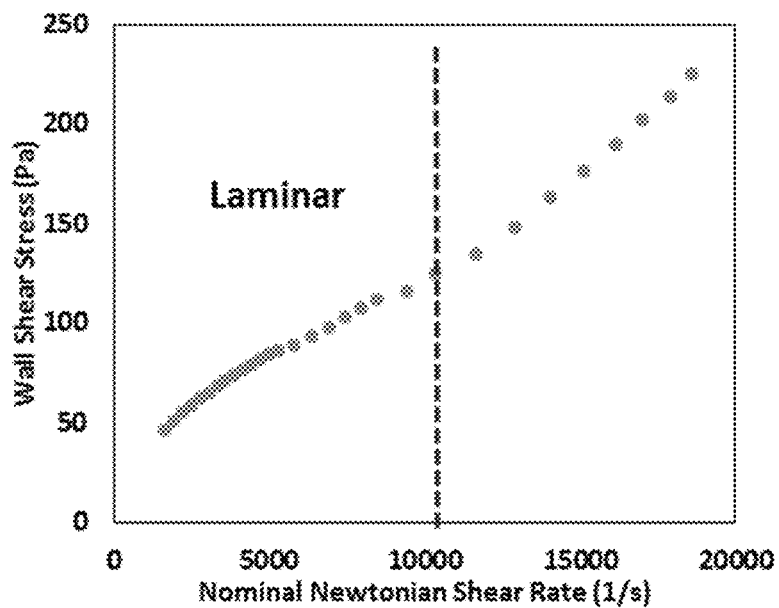
FIG. 15 shows the fluid transition from laminar flow for mud B (data obtained from the small pipe, 0.9525 cm outer diameter).

As shown in FIG. 14 and FIG. 15, the sharp increase in wall shear stress that is observed as the fluid velocity increases beyond the laminar flow region is observable. The critical Reynolds number (the value at which the flow transitions from laminar regime) was found to be approximately 2100 for mud A (bentonite mud), which is anticipated for most non-Newtonian drilling fluids. However, according to FIG. 15, the critical Reynolds number for mud B (polymer mud) is significantly higher (approximately 4600), which indicates a delayed transition to turbulence for this mud. This is attributed to the viscoelastic properties of the polymer mud (mud B). This example indicates that the critical Reynolds number depends on the mud type, and applying a generic value for all drilling fluids can result in a significant error in equivalent circulating density and pump pressure predictions.

As mentioned earlier, to calculate the frictional pressure loss in turbulent flow, the friction factor should be properly characterized. When the turbulent pressure loss data is not available, friction factor can be obtained by using the existing correlations such as the Dodge-Metzner correlation (Equation 8). In order to calculate the friction factor from Equation 8, values for the fluid behavior index and Reynolds number must be known. The fluid behavior index, m, for each fluid is presented in Table 3. The Reynolds number for each fluid at a specific flow rate was obtained from Equation 9.

$$Re = \frac{8\rho v^2}{\tau_w} \qquad \text{Eq. 9}$$

However, since the current pipe viscometer set up provides the turbulent frictional pressure loss at different Reynolds numbers for the measurement section, it is possible to find a mathematical relationship between the friction factor and Reynolds number. To find such a relationship for each fluid, an equation in the general from of Equation 10:

$$f = a + b(Re)^c \qquad \text{Eq. 10}$$

was used (Chilton R A and Stainsby R. Journal of Hydraulic Engineering, 1998, 124(5), 522-529). Constants a, b, and c for each drilling fluid were found by fitting a curve to the friction factor vs. Reynolds number curve obtained from the pipe viscometer (Table 4). Note that correlations such as the Dodge-Metzner correlation rely on experimental results that are obtained from a limited number of tests and hence may not reveal acceptable accuracy for all non-Newtonian drilling fluids.

TABLE 4

Constants a, b and c for the friction factor equation (Equation 10).

| Parameter | Mud A | Mud B |
|---|---|---|
| a | −0.00129 | 0.000 |
| b | 0.08071 | 1.099 |
| c | −0.2456 | −0.7025 |

Figure 16:
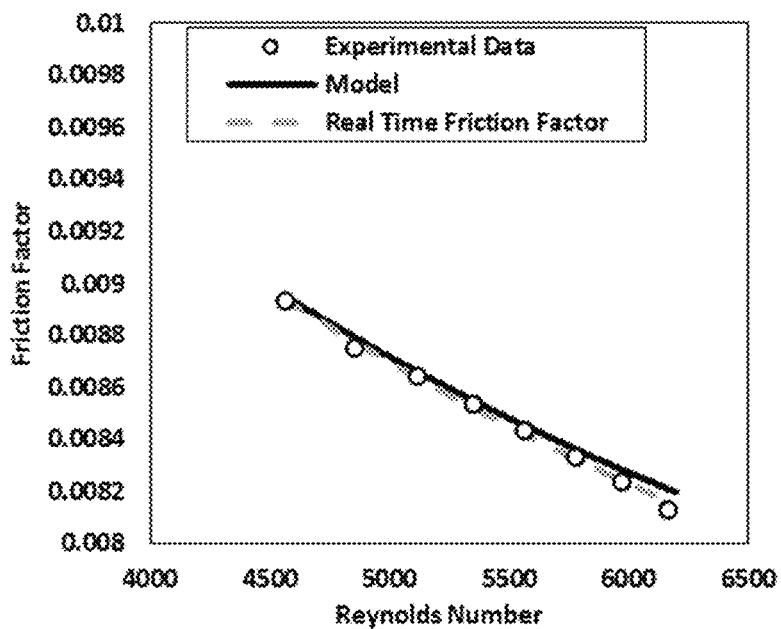
FIG. 16 shows a comparison of the friction factor obtained from the Dodge-Metzner correlation and the experimental data for mud A.
Figure 17:
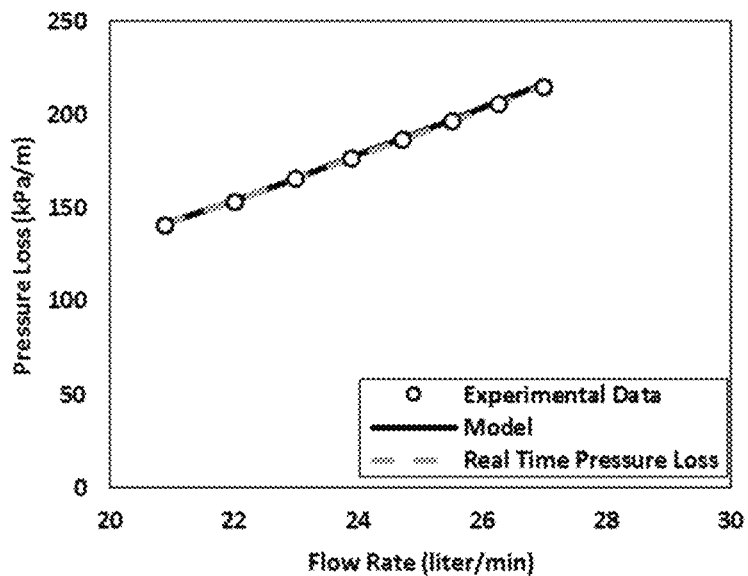
FIG. 17 shows a comparison of the pressure loss obtained from the Dodge-Metzner correlation and the experimental data for mud A.
Figure 18:
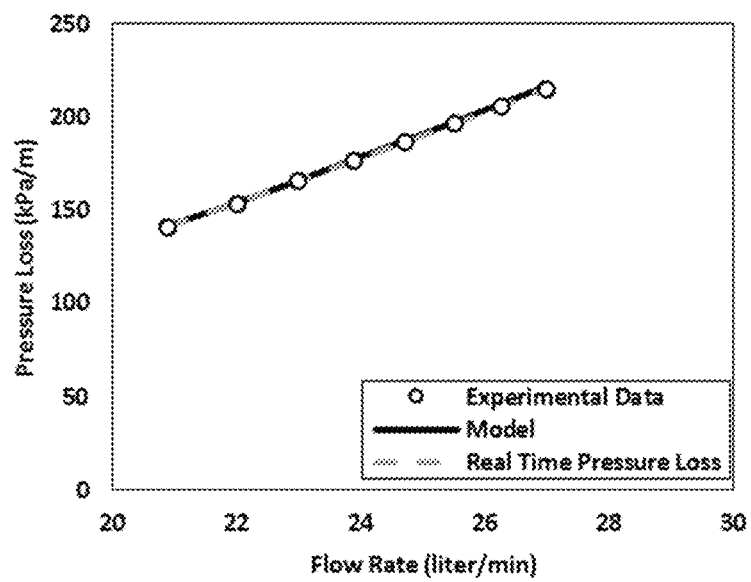
FIG. 18 shows a comparison of the friction factor obtained from the Dodge-Metzner correlation and the experimental data for mud B.
Figure 19:
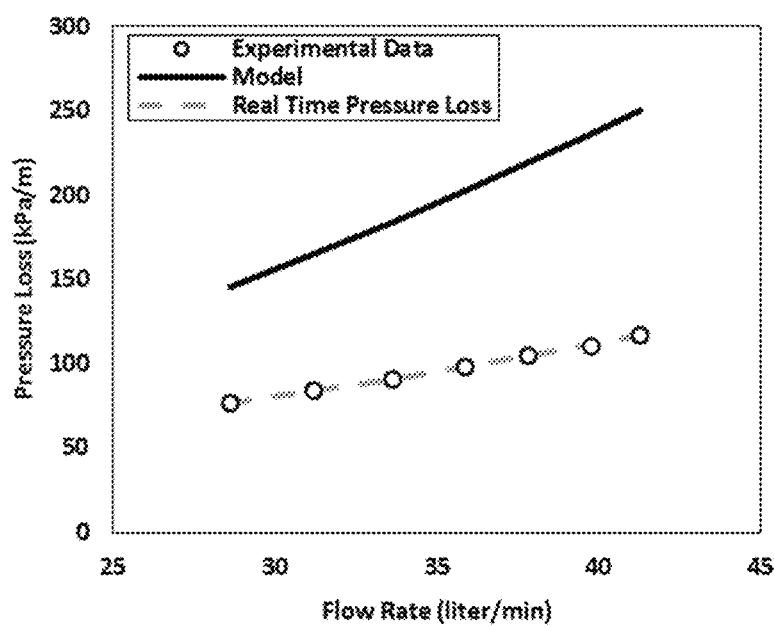
FIG. 19 shows a comparison of the pressure loss obtained from the Dodge-Metzner correlation and the experimental data for mud B.

FIG. 16 compares the friction factors obtained from Equation 8 (theoretical model) with Equation 10 (real-time model) for mud A. FIG. 16 indicates that the Dodge-Metzner correlation demonstrates acceptable accuracy for mud A (bentonite mud). Therefore, the estimated pressure drop values are in close agreement with the experimental values (FIG. 17). However, for mud B (polymer-based mud), the calculated friction factors are significantly higher than the experimental values (FIG. 18) and the Dodge-Metzner correlation performs poorly. Therefore, the theoretical model largely over-estimates the pressure loss for mud B in the turbulent flow regime (FIG. 19). The lower-than-expected friction coefficient values for mud B can be due to inherent friction reduction qualities of the polymer-based mud, which has been observed in other investigations as well (e.g., Subramanian R and Azar J J. Society of Petroleum Engineers, International Oil and Gas Conference and Exhibition in China, 7-10 Nov. 2000, Beijing, China, SPE-64647-MS; Graham M D. Rheology Reviews, 2004, 2, 143-170). In addition, most non-Newtonian drilling muds exhibit time-dependent behavior, which makes non-Newtonian friction correlations, such as the Dodge-Metzner correlation, less reliable. The difference between the actual and modeled friction factor highlights the importance of the inline rheology measurement, and carrying out monitoring during ongoing drilling operations. Knowledge of mud rheological parameters, critical Reynolds number, friction factor, density, and temperature is crucial for real-time hydraulic programs to deliver valid outputs. With the development of new mud formulations and the ever-growing necessity of knowing and managing equivalent circulating density and pump pressure, particularly in deep offshore wells, providing accurate inputs for hydraulic models is vital. In addition, real-time mud monitoring can prevent well problems by early detection of undesired variations in mud properties.

One other application for the real-time friction factor as outlined above is for hydraulic fracturing (also known as "fracking") where a friction reducer is added to fracturing fluid to reduce the frictional pressure loss and maximum pump pressure. Adding a friction reducer in the field is usually conducted far from the ideal and controlled lab environment; therefore, friction reduction measurements at the rig site to determine the effectiveness of the friction reducer is of high demand.

Herein, an alternative to the industry standard rotational rheometer for mud rheology characterization using a pipe viscometer approach was discussed. Pipe viscometers measure pressure losses across a length of pipe for a certain flow rate. Variation of the flow rate allows for characterization of a rheogram, from which rheological parameters can be derived using a suitable rheological model (e.g., Bingham plastic, Power Law, Yield Power Law/Herschel Bulkley, Casson's Model).

The pipe viscometer can yield the same information that traditional rotational viscometers provide, but with certain added advantages. First, a pipe viscometer lends itself to robust automation, as shown by the experiments described herein, which were done with a fully automated set-up that did not require any human interaction for either its operation or its mud rheology characterization using computer data analysis. Pipe viscometers are less prone to plugging by solid particles, provided the selected pipe diameter is large enough. A larger diameter pipe (a diameter of 1" or larger is recommended for field applications) will put demands on the accuracy and resolution of the pressure transducers and the length of pipe that is used for measuring pressure losses, but these issues can be addressed in field applications. These applications range from mud characterization in mud mixing plants to advanced deep-water drilling operation in narrow-margin downhole environments. Other potential advantages revolve around the fact that the pipe viscometer can provide additional information. By using a Coriolis flow meter to characterize flow rate, mud density can be directly monitored. Furthermore, the pipe viscometer can be used to characterize the critical Reynolds number and the friction factor, which are important quantities when carrying out high-fidelity hydraulics calculations. As such, more accurate frictional pressure loss and equivalent circulating density calculations can be achieved during drilling and completion/stimulation operations (e.g. during hydraulic fracturing).

The automated pipe viscometer was used in a detailed study to characterize rheological parameters for muds including bentonite Water-Based Mud (WBM), polymer Water-Based Mud, and Synthetic-Based Mud. In all cases, rheology was accurately characterized, as verified using rotational viscometer tests. An important observation is that the automated pipe viscometer allowed for real-time monitoring of mud changes, such as caused by mud contamination. This adds an important safety component to drilling operations, as adverse changes in mud rheology can be immediately identified, diagnosed and communicated, allowing quick preventative or remedial action to be taken. In addition, critical Reynolds numbers and friction factors were characterized for the mud systems under study. Significant deviations from fluid transport theory were observed for polymer Water-Based Mud.

The real-time viscometer measurement using the pipe viscometer approach shown here presents: (1) a step-change improvement in mud monitoring and (ultimately) maintenance; (2) an improvement in the ability to feed accurate rheological information in real-time into sophisticated hydraulics models used to manage equivalent circulating density and new technologies such as managed pressure drilling and dual gradient drilling; and (3) an improvement in rig safety and efficiency.

The methods and systems of the appended claims are not limited in scope by the specific methods and systems described herein, which are intended as illustrations of a few aspects of the claims and any methods and systems that are functionally equivalent are intended to fall within the scope of the claims. Various modifications of the methods and systems in addition to those shown and described herein are intended to fall within the scope of the appended claims. Further, while only certain representative method steps and system components disclosed herein are specifically described, other combinations of the method steps and system components also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A method for determining a first fluid characteristic and a second fluid characteristic of a fluid within a flow region of a pipe viscometer, comprising:

pumping the fluid at a first flow rate of a plurality of flow rates;

measuring, across the flow region of the pipe viscometer, a first differential pressure of the fluid flowing at the first flow rate, wherein the flow region comprises an area inside a conduit, an annulus, or a combination thereof;

pumping the fluid at a second flow rate of the plurality of flow rates, wherein the second flow rate is different from the first flow rate;

measuring, across the flow region of the pipe viscometer, a second differential pressure of the fluid flowing at the second flow rate;

receiving, using a processing device, the first and second flow rates and the first and second differential pressure measurements;

storing, using the processing device, the first and second flow rates and the first and second differential pressure measurements;

determining, using the processing device, shear stress values and first shear rate values of the fluid at each of the first and second flow rates;

determining, using the processing device, the first fluid characteristic of the fluid using the shear stress values at each of the first and second flow rates, wherein the first fluid characteristic comprises a friction factor, a Reynolds number, or a combination thereof;

determining, using the processing device, flow behavior index values of the fluid at each of the first and second flow rates based on the shear stress and first shear rate values at each of the first and second flow rates;

determining, using the processing device, second shear rate values based on the flow behavior index values at each of the first and second flow rates, wherein the second shear rate values represent the shear rate at a wall of the flow region;

determining, using the processing device, the second fluid characteristic of the fluid using a rheological model that relates the shear stress and second shear rate values at each of the first and second flow rates; wherein the rheological model comprises the Yield Power Law Model; and wherein the second fluid characteristic comprises at least one of a consistency index, a yield stress, a fluid behavior index, or a combination thereof;

determining, using the processing device, Reynolds number values of the fluid at each of the first and second flow rates;

determining, using the processing device, friction factor values of the fluid at each of the first and second flow rates;

determining, using the processing device, parameters of a model relating the Reynolds number and friction factor values at each of the first and second flow rates;

determining, based on the model, one or more additional friction factor values of the fluid at downhole conditions of a well; and providing the one or more additional friction factor values to a hydraulic model of the well.

2. The method of claim 1, wherein measuring the first and second differential pressure measurements of the fluid flowing within the flow region comprises:

measuring, at each of the first and second flow rates, a first pressure of the fluid flowing within the flow region using a first pressure sensor at a first location within the flow region;

measuring, at each of the first and second flow rates, a second pressure of the fluid flowing within the flow region using a second pressure sensor at a second location within the flow region, the second location being different from the first location; and calculating, using the processing device, the first and second differential pressure measurements of the fluid flowing within the flow region using the first and second pressure measurements measured by the first and second pressure sensors at each of the first and second flow rates.

3. The method of claim 1, wherein the flow region comprises an area inside a conduit.

4. The method of claim 3, wherein the conduit is situated at or above the Earth's surface.

5. The method of claim 3, wherein the conduit is situated within a wellbore and the first and second flow rates and the first and second differential pressure measurements are obtained at downhole conditions of the wellbore.

6. The method of claim 3, wherein the conduit comprises a wired drill pipe.

7. The method of claim 1, wherein the flow region comprises an annulus.

8. The method of claim 7, wherein the annulus is a region between a conduit and a wellbore.

9. The method of claim 8, wherein the first and second flow rates and the first and second differential pressure measurements are obtained at downhole conditions of the wellbore.

10. The method of claim 8, further comprising correcting, using the processing device, the first and second differential pressure measurements of the fluid for eccentricity between the conduit and the wellbore.

11. The method of claim 1, further comprising determining a temperature of the fluid.

12. The method of claim 1, wherein the fluid comprises a non-Newtonian fluid, a drilling fluid, or a combination thereof.

13. The method of claim 1, further comprising:

generating a logarithmic plot of the shear stress and first shear rate values, wherein determining the flow behavior index values includes determining a slope of the logarithmic plot at each of the first and second flow rates.

14. A system for determining a first fluid characteristic and a second fluid characteristic of a fluid within a flow region, the system comprising:

a conduit;

a flow meter configured to measure, during different time intervals, first and second flow rates of a plurality of flow rates of the fluid flowing within the flow region, wherein the first and second flow rates are different from each other, and wherein the flow region comprises an area inside the conduit, an annulus, or a combination thereof;

a pressure sensor configured to measure, across the flow region, first and second differential pressures corresponding to the first and second flow rates of the fluid flowing within the flow region; and a processing device configured to:

receive the first and second flow rates of the fluid from the flow meter;

receive the corresponding first and second differential pressure measurements of the fluid from the pressure sensor;

store the first and second flow rates and the corresponding first and second differential pressure measurements;

determine shear stress values and wall shear rate values of the fluid at each of the first and second flow rates;

determine the first fluid characteristic of the fluid using the shear stress values at each of the first and second flow rates, wherein the first fluid characteristic comprises a friction factor, a Reynolds number, or a combination thereof;

determine the second fluid characteristic of the fluid using a rheological model that relates the shear stress and wall shear rate values at each of the first and second flow rates; wherein the rheological model comprises the Yield Power Law Model; and wherein the second fluid characteristic comprises at least one of a consistency index, a yield stress, a fluid behavior index, or a combination thereof;

determine Reynolds number values of the fluid at each of the first and second flow rates;

determine friction factor values of the fluid at each of the first and second flow rates;

determine parameters of a model relating the Reynolds number and friction factor values at each of the first and second flow rates;

determine, based on the model, one or more additional friction factor values of the fluid at downhole conditions of a well; and provide the one or more additional friction factor values to a hydraulic model of the well.

15. The method of claim 14, wherein the processing device is further configured to:

determine nominal Newtonian shear rate values at each of the first and second flow rates using the first and second flow rates and the corresponding first and second differential pressure measurements; and determine flow behavior index values of the fluid at each of the first and second flow rates based on the shear stress and nominal Newtonian shear rate values at each of the first and second flow rates; and wherein determining the wall shear rate values includes using the flow behavior index values of the fluid at each of the first and second flow rates.

16. A method for determining rheological parameters of a fluid within a flow region, comprising:

pumping the fluid at a first flow rate of a plurality of flow rates;

measuring, across the flow region, a first differential pressure of the fluid at the first flow rate;

pumping the fluid at a second flow rate of the plurality of flow rates, wherein the second flow rate is different from the first flow rate;

measuring, across the flow region, a second differential pressure of the fluid at the second flow rate;

receiving, using a processing device, the first and second flow rates and the first and second differential pressure measurements;

determining, using the processing device, shear stress values and first shear rate values of the fluid at each of the first and second flow rates;

determining, using the processing device, flow behavior index values of the fluid at each of the first and second flow rates based on the shear stress and first shear rate values at each of the first and second flow rates;

determining, using the processing device, second shear rate values based on the flow behavior index values at each of the first and second flow rates, wherein the second shear rate values represent the shear rate at a wall of the flow region;

determining, using the processing device, a rheological parameter of the fluid using a rheological model that relates the shear stress and second shear rate values at each of the first and second flow rates;

determining, using the processing device, Reynolds number values of the fluid at each of the first and second flow rates;

determining, using the processing device, friction factor values of the fluid at each of the first and second flow rates;

determining, using the processing device, parameters of a model relating the Reynolds number and friction factor values at each of the first and second flow rates;

determining, based on the model, one or more additional friction factor values of the fluid at downhole conditions of a well; and providing the one or more additional friction factor values to a hydraulic model of the well.

17. The method of claim 16, further comprising generating a logarithmic plot of the shear stress and wall shear rate values, wherein determining the flow behavior index values includes determining a slope of the logarithmic plot at each of the first and second flow rates.

* * * * *